US008995619B2

(12) United States Patent
Gray et al.

(10) Patent No.: US 8,995,619 B2
(45) Date of Patent: Mar. 31, 2015

(54) PERSONNEL SCREENING SYSTEM

(75) Inventors: Stephen Gray, Salem, OR (US); Ronald Hughes, Garden Grove, CA (US); Peter Ryge, Carlsbad, CA (US); Andreas F. Kotowski, Rancho Palos Verdes, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 531 days.

(21) Appl. No.: 13/047,677

(22) Filed: Mar. 14, 2011

(65) Prior Publication Data

US 2011/0274249 A1 Nov. 10, 2011

Related U.S. Application Data

(63) Continuation-in-part of application No. 12/887,510, filed on Sep. 22, 2010, and a continuation-in-part of application No. 12/849,987, filed on Aug. 4, 2010, now Pat. No. 8,135,112.

(60) Provisional application No. 61/313,772, filed on Mar. 14, 2010, provisional application No. 61/423,585, filed on Dec. 15, 2010, provisional application No. 61/423,582, filed on Dec. 15, 2010, provisional application No. 61/423,586, filed on Dec. 15, 2010.

(51) Int. Cl.
*G01N 23/201* (2006.01)
*G01V 5/00* (2006.01)

(52) U.S. Cl.
CPC ............ *G01V 5/0008* (2013.01); *G01V 5/0025* (2013.01)
USPC .............................................. 378/87; 378/57

(58) Field of Classification Search
USPC .................. 378/57, 62, 86–88, 160, 193–197
See application file for complete search history.

(56) References Cited

U.S. PATENT DOCUMENTS

| 3,678,278 A | 7/1972 | Peil |
| 3,780,291 A | 12/1973 | Stein et al. |
| 3,790,799 A | 2/1974 | Stein et al. |
| 3,843,881 A | 10/1974 | Barton, Jr. et al. |
| 3,884,816 A | 5/1975 | Takahashi |
| RE28,544 E | 9/1975 | Stein et al. |
| 3,919,467 A | 11/1975 | Peugeot |

(Continued)

FOREIGN PATENT DOCUMENTS

| EP | 0261984 A2 | 3/1988 |
| WO | WO 2009/006044 | 1/2009 |

(Continued)

OTHER PUBLICATIONS

ANSI, Radiation Safety for Personnel Security Screening Systems ing X-Rays, Apr. 3, 2002.
Daniel Strom, "Screening Individuals with Backscatter X-Ray Systems", Health Physics Society, Feb. 3, 2005.
Gerald J. Smith, "Bodysearch Technology es X-ray Imaging to Remove Hazards and Humiliation from Personnel Searches", IEEE, 1995.

(Continued)

*Primary Examiner* — Courtney Thomas
(74) *Attorney, Agent, or Firm* — Novel IP

(57) ABSTRACT

The present specification discloses an inspection system for detecting objects being carried by a person who is moving along a pathway. The inspection system has two detection systems configured to detect radiation scattered from the person as the person moves along the pathway and an X-ray source positioned between the detection systems. The X-ray source is configured to generate a vertical beam spot pattern and does not generate beams that move horizontally.

17 Claims, 28 Drawing Sheets

(56) References Cited

U.S. PATENT DOCUMENTS

| | | | |
|---|---|---|---|
| 3,924,064 | A | 12/1975 | Nomura et al. |
| 3,961,186 | A | 6/1976 | Leunbach |
| 3,971,948 | A | 7/1976 | Pfeiler et al. |
| 3,990,175 | A | 11/1976 | Conway et al. |
| 4,008,400 | A | 2/1977 | Brunnett et al. |
| 4,020,346 | A | 4/1977 | Dennis |
| 4,031,545 | A | 6/1977 | Stein et al. |
| 4,047,035 | A | 9/1977 | Dennhoven et al. |
| 4,064,440 | A | 12/1977 | Roder |
| 4,070,576 | A | 1/1978 | Cobb |
| 4,107,532 | A | 8/1978 | MaCovski |
| 4,112,301 | A | 9/1978 | Annis et al. |
| 4,139,771 | A | 2/1979 | Dennhoven et al. |
| 4,160,165 | A | 7/1979 | McCombs et al. |
| 4,179,100 | A | 12/1979 | Sashin et al. |
| 4,196,352 | A | 4/1980 | Berninger et al. |
| 4,200,800 | A | 4/1980 | Swift |
| 4,228,353 | A | 10/1980 | Johnson |
| 4,228,357 | A | 10/1980 | Annis |
| 4,242,583 | A | 12/1980 | Annis et al. |
| 4,242,588 | A | 12/1980 | Silk et al. |
| 4,260,898 | A | 4/1981 | Annis |
| 4,298,800 | A | 11/1981 | Goldman |
| 4,303,830 | A | 12/1981 | Heinzelmann et al. |
| 4,342,914 | A | 8/1982 | Bjorkholm |
| 4,349,739 | A | 9/1982 | Annis |
| 4,366,382 | A | 12/1982 | Kotowski |
| 4,366,576 | A | 12/1982 | Annis |
| 4,380,817 | A | 4/1983 | Harding et al. |
| 4,389,729 | A | 6/1983 | Stein |
| 4,414,682 | A | 11/1983 | Annis et al. |
| 4,422,177 | A | 12/1983 | Mastronardi et al. |
| 4,426,721 | A | 1/1984 | Wang |
| 4,454,605 | A | 6/1984 | DeLucia |
| 4,472,822 | A | 9/1984 | Swift |
| 4,503,332 | A | 3/1985 | Annis |
| 4,514,691 | A | 4/1985 | De Los Santos et al. |
| 4,525,854 | A | 6/1985 | Molbert et al. |
| 4,535,245 | A | 8/1985 | Zonneveld et al. |
| 4,549,307 | A | 10/1985 | Macovski |
| 4,578,806 | A | 3/1986 | Grass et al. |
| 4,586,441 | A | 5/1986 | Zekich |
| 4,598,415 | A | 7/1986 | Luccio et al. |
| 4,672,837 | A | 6/1987 | Cottrell, Jr. |
| 4,692,937 | A | 9/1987 | Sashin et al. |
| 4,711,994 | A | 12/1987 | Greenberg |
| 4,736,401 | A | 4/1988 | Donges et al. |
| 4,745,631 | A | 5/1988 | Paolini |
| 4,756,015 | A | 7/1988 | Doenges et al. |
| 4,759,047 | A | 7/1988 | Donges et al. |
| 4,768,214 | A | 8/1988 | Bjorkholm |
| 4,783,794 | A | 11/1988 | Dietrich |
| 4,799,247 | A | 1/1989 | Annis et al. |
| 4,807,637 | A | 2/1989 | Bjorkholm |
| 4,809,312 | A | 2/1989 | Annis |
| 4,817,121 | A | 3/1989 | Shimizu et al. |
| 4,819,256 | A | 4/1989 | Annis et al. |
| 4,821,023 | A | 4/1989 | Parks |
| 4,825,454 | A | 4/1989 | Annis et al. |
| 4,839,913 | A | 6/1989 | Annis et al. |
| 4,841,555 | A | 6/1989 | Doi et al. |
| 4,845,769 | A | 7/1989 | Burstein et al. |
| 4,864,142 | A | 9/1989 | Gomberg |
| 4,870,670 | A | 9/1989 | Geus |
| 4,884,289 | A | 11/1989 | Glockmann et al. |
| 4,890,310 | A | 12/1989 | Umetani et al. |
| 4,893,015 | A | 1/1990 | Kubierschky et al. |
| 4,894,619 | A | 1/1990 | Leinonen et al. |
| 4,899,283 | A | 2/1990 | Annis |
| 4,961,214 | A | 10/1990 | Van Endschot et al. |
| 4,974,247 | A | 11/1990 | Friddell |
| 4,979,137 | A | 12/1990 | Gerstenfeld et al. |
| 4,995,066 | A | 2/1991 | Harding et al. |
| 5,007,072 | A | 4/1991 | Jenkins et al. |
| 5,022,062 | A | 6/1991 | Annis |
| 5,033,073 | A | 7/1991 | Friddell |
| 5,038,370 | A | 8/1991 | Harding et al. |
| 5,039,981 | A | 8/1991 | Rodriguez |
| 5,044,002 | A | 8/1991 | Stein |
| 5,084,619 | A | 1/1992 | Pfeiler et al. |
| 5,115,459 | A | 5/1992 | Bertozzi |
| 5,120,706 | A | 6/1992 | Weeks |
| 5,121,105 | A | 6/1992 | Aittoniemi |
| 5,127,030 | A | 6/1992 | Annis et al. |
| 5,132,995 | A | 7/1992 | Stein |
| 5,156,270 | A | 10/1992 | Kachel et al. |
| 5,179,581 | A | 1/1993 | Annis |
| 5,181,234 | A | 1/1993 | Smith |
| 5,182,764 | A | 1/1993 | Peschmann et al. |
| 5,212,720 | A | 5/1993 | Landi et al. |
| 5,224,144 | A | 6/1993 | Annis |
| 5,243,693 | A | 9/1993 | Maron |
| 5,247,561 | A | 9/1993 | Kotowski |
| 5,253,283 | A | 10/1993 | Annis et al. |
| 5,260,982 | A | 11/1993 | Fujii et al. |
| 5,313,511 | A | 5/1994 | Annis et al. |
| 5,367,552 | A | 11/1994 | Peschmann |
| 5,394,454 | A | 2/1995 | Harding |
| 5,397,986 | A | 3/1995 | Conway et al. |
| 5,420,905 | A | 5/1995 | Bertozzi |
| 5,430,787 | A | 7/1995 | Norton |
| 5,463,224 | A | 10/1995 | Burstein et al. |
| 5,483,569 | A | 1/1996 | Annis |
| 5,490,218 | A | 2/1996 | Krug et al. |
| 5,493,596 | A | 2/1996 | Annis |
| 5,503,424 | A | 4/1996 | Agopian |
| 5,524,133 | A | 6/1996 | Neale et al. |
| 5,528,656 | A | 6/1996 | Annis |
| 5,572,121 | A | 11/1996 | Beswick |
| 5,579,360 | A | 11/1996 | Abdel-Mottaleb |
| 5,590,057 | A | 12/1996 | Fletcher et al. |
| 5,600,303 | A | 2/1997 | Husseiny et al. |
| 5,600,700 | A | 2/1997 | Krug et al. |
| 5,602,893 | A | 2/1997 | Harding |
| 5,638,420 | A | 6/1997 | Armistead |
| 5,642,393 | A | 6/1997 | Krug et al. |
| 5,642,394 | A | 6/1997 | Rothschild |
| 5,660,549 | A | 8/1997 | Witt, III |
| 5,666,393 | A | 9/1997 | Annis |
| 5,692,028 | A | 11/1997 | Geus et al. |
| 5,692,029 | A | 11/1997 | Husseiny et al. |
| 5,696,806 | A | 12/1997 | Grodzins et al. |
| 5,699,400 | A | 12/1997 | Lee et al. |
| 5,763,886 | A | 6/1998 | Schulte |
| 5,764,683 | A | 6/1998 | Swift et al. |
| 5,796,110 | A | 8/1998 | An et al. |
| 5,838,758 | A | 11/1998 | Krug et al. |
| 5,882,206 | A | 3/1999 | Gillio |
| 5,892,840 | A | 4/1999 | Jang et al. |
| 5,910,973 | A | 6/1999 | Grodzins |
| 5,930,326 | A | 7/1999 | Rothschild et al. |
| 5,940,468 | A | 8/1999 | Huang et al. |
| 5,966,422 | A | 10/1999 | Dafni et al. |
| 5,974,111 | A | 10/1999 | Krug et al. |
| 6,018,562 | A | 1/2000 | Willson |
| 6,044,353 | A | 3/2000 | Pugliese, III |
| 6,057,761 | A | 5/2000 | Yukl |
| 6,081,580 | A | 6/2000 | Grodzins et al. |
| 6,094,472 | A | 7/2000 | Smith |
| 6,137,895 | A | 10/2000 | Al-Sheikh |
| 6,151,381 | A | 11/2000 | Grodzins et al. |
| 6,192,104 | B1 | 2/2001 | Adams et al. |
| 6,212,251 | B1 | 4/2001 | Tomura et al. |
| 6,236,709 | B1 | 5/2001 | Perry et al. |
| 6,249,567 | B1 | 6/2001 | Rothschild et al. |
| 6,269,142 | B1 | 7/2001 | Smith |
| 6,272,206 | B1 | 8/2001 | Bjorkholm |
| 6,278,115 | B1 | 8/2001 | Annis et al. |
| 6,282,264 | B1 | 8/2001 | Smith et al. |
| 6,298,603 | B1 | 10/2001 | Diaz |
| 6,301,326 | B2 | 10/2001 | Bjorkholm |
| 6,301,327 | B1 | 10/2001 | Martens et al. |
| 6,308,644 | B1 | 10/2001 | Diaz |
| 6,315,308 | B1 | 11/2001 | Konopka |

(56) References Cited

U.S. PATENT DOCUMENTS

| | | |
|---|---|---|
| RE37,467 E | 12/2001 | Brasch et al. |
| 6,366,203 B1 | 4/2002 | Burns |
| 6,370,222 B1 | 4/2002 | Cornick, Jr. |
| 6,375,697 B2 | 4/2002 | Davies |
| 6,393,095 B1 | 5/2002 | Robinson |
| 6,418,194 B1 | 7/2002 | Mcpherson et al. |
| 6,421,420 B1 | 7/2002 | Grodzins |
| 6,442,233 B1 | 8/2002 | Grodzins et al. |
| 6,459,761 B1 | 10/2002 | Grodzins et al. |
| 6,459,764 B1 | 10/2002 | Chalmers et al. |
| 6,473,487 B1 | 10/2002 | Le |
| 6,484,650 B1 | 11/2002 | Stomski |
| 6,507,278 B1 | 1/2003 | Brunetti et al. |
| 6,546,072 B1 | 4/2003 | Chalmers |
| 6,552,346 B2 | 4/2003 | Verbinski et al. |
| 6,553,096 B1 | 4/2003 | Zhou et al. |
| 6,556,653 B2 | 4/2003 | Hussein |
| 6,567,496 B1 | 5/2003 | Sychev |
| 6,597,760 B2 | 7/2003 | Beneke et al. |
| 6,610,977 B2 | 8/2003 | Megerle |
| 6,621,888 B2 | 9/2003 | Grodzins et al. |
| 6,628,745 B1 | 9/2003 | Annis et al. |
| 6,634,668 B2 | 10/2003 | Urffer, III et al. |
| 6,653,588 B1 | 11/2003 | Gillard-hickman |
| 6,665,373 B1 | 12/2003 | Kotowski et al. |
| 6,674,367 B2 | 1/2004 | Sweatte |
| 6,707,879 B2 | 3/2004 | McClelland et al. |
| 6,721,391 B2 | 4/2004 | McClelland et al. |
| 6,742,301 B1 | 6/2004 | Schwarz |
| 6,745,520 B2 | 6/2004 | Puskaric et al. |
| 6,749,207 B2 | 6/2004 | Nadeau |
| 6,754,304 B1 | 6/2004 | Kumakhov |
| 6,785,360 B1 | 8/2004 | Annis |
| 6,819,109 B2 | 11/2004 | Sowers et al. |
| 6,819,241 B2 | 11/2004 | Turner et al. |
| 6,839,403 B1 | 1/2005 | Kotowski et al. |
| 6,848,826 B2 | 2/2005 | Marie et al. |
| 6,870,791 B1 | 3/2005 | Caulfield et al. |
| 6,876,719 B2 | 4/2005 | Ozaki |
| 6,879,657 B2 | 4/2005 | Hoffman |
| 6,891,381 B2 | 5/2005 | Bailey et al. |
| 6,899,540 B1 | 5/2005 | Neiderman et al. |
| 6,901,346 B2 | 5/2005 | Tracy et al. |
| 6,911,907 B2 | 6/2005 | Kelliher et al. |
| 6,952,163 B2 | 10/2005 | Huey et al. |
| 6,965,340 B1 | 11/2005 | Baharav et al. |
| 6,967,612 B1 | 11/2005 | Gorman et al. |
| 6,970,086 B2 | 11/2005 | Nelson |
| 6,970,087 B2 | 11/2005 | Stis |
| 6,990,175 B2 | 1/2006 | Nakashima et al. |
| 7,053,785 B2 | 5/2006 | Akins |
| 7,092,485 B2 | 8/2006 | Kravis |
| 7,103,137 B2 | 9/2006 | Seppi et al. |
| 7,110,493 B1 | 9/2006 | Kotowski et al. |
| 7,110,925 B2 | 9/2006 | Pendergraft et al. |
| 7,114,849 B2 | 10/2006 | Atzinger et al. |
| 7,142,638 B2 | 11/2006 | Polichar et al. |
| 7,162,005 B2 | 1/2007 | Bjorkholm |
| 7,164,747 B2 | 1/2007 | Ellenbogen et al. |
| 7,185,206 B2 | 2/2007 | Goldstein |
| 7,203,276 B2 | 4/2007 | Arsenault et al. |
| 7,257,189 B2 | 8/2007 | Modica et al. |
| 7,265,709 B2 | 9/2007 | Fleisher et al. |
| 7,286,634 B2 | 10/2007 | Sommer, Jr. et al. |
| 7,305,062 B2 | 12/2007 | Hambuchen et al. |
| 7,305,063 B2 | 12/2007 | Heuscher |
| 7,330,529 B2 | 2/2008 | Kautzer et al. |
| 7,333,587 B2 | 2/2008 | De Man et al. |
| 7,356,115 B2 | 4/2008 | Ford et al. |
| 7,365,672 B2 | 4/2008 | Keller et al. |
| 7,400,701 B1 | 7/2008 | Cason |
| 7,418,077 B2 | 8/2008 | Gray |
| 7,460,636 B2 | 12/2008 | Ein-gal |
| 7,476,023 B1 | 1/2009 | Canfield et al. |
| 7,505,557 B2 | 3/2009 | Modica et al. |
| 7,505,562 B2 | 3/2009 | Dinca et al. |
| 7,551,709 B2 | 6/2009 | Schlomka et al. |
| 7,551,715 B2 | 6/2009 | Rothschild et al. |
| 7,561,666 B2 | 7/2009 | Annis |
| 7,593,506 B2 | 9/2009 | Cason |
| 7,593,510 B2 | 9/2009 | Rothschild |
| 7,639,866 B2 | 12/2009 | Pomero et al. |
| 7,660,388 B2 | 2/2010 | Gray |
| 7,684,544 B2 | 3/2010 | Wilson |
| 7,783,004 B2 | 8/2010 | Kotowski et al. |
| 7,796,394 B2 | 9/2010 | Wang |
| 7,796,733 B2 | 9/2010 | Hughes |
| 7,796,734 B2 | 9/2010 | Mastronardi et al. |
| 7,806,589 B2 | 10/2010 | Tashman et al. |
| 7,809,109 B2 | 10/2010 | Mastronardi et al. |
| 7,817,776 B2 | 10/2010 | Agrawal et al. |
| 7,826,589 B2 | 11/2010 | Kotowski et al. |
| 8,135,112 B2 | 3/2012 | Hughes |
| 2002/0045152 A1 | 4/2002 | Viscardi et al. |
| 2003/0012338 A1 | 1/2003 | Lienard et al. |
| 2003/0171939 A1 | 9/2003 | Yagesh et al. |
| 2003/0225612 A1 | 12/2003 | DeSimone et al. |
| 2003/0229506 A1 | 12/2003 | Scott et al. |
| 2004/0088584 A1 | 5/2004 | Shachar et al. |
| 2004/0175018 A1 | 9/2004 | Macarthur et al. |
| 2006/0262902 A1 | 11/2006 | Wattenburg |
| 2007/0009088 A1 | 1/2007 | Edic et al. |
| 2007/0086564 A1 | 4/2007 | Bruder et al. |
| 2007/0235652 A1 | 10/2007 | Smith |
| 2009/0116617 A1* | 5/2009 | Mastronardi et al. ........... 378/87 |
| 2011/0017917 A1 | 1/2011 | Mastronardi et al. |
| 2011/0096901 A1 | 4/2011 | Kotowski et al. |
| 2011/0164726 A1 | 7/2011 | Mastronardi et al. |
| 2011/0274249 A1 | 11/2011 | Gray et al. |
| 2011/0274250 A1 | 11/2011 | Gray et al. |
| 2011/0293072 A1 | 12/2011 | Kaminski |
| 2011/0299659 A1 | 12/2011 | Gray et al. |

FOREIGN PATENT DOCUMENTS

| | | |
|---|---|---|
| WO | 2009082762 | 7/2009 |
| WO | WO 2009/082762 | 7/2009 |
| WO | WO/2011/115923 A1 | 9/2011 |
| WO | WO/2011/115930 A2 | 9/2011 |
| WO | WO/2011/115934 A2 | 9/2011 |
| WO | WO/2011/115935 A1 | 9/2011 |

OTHER PUBLICATIONS

International Search Report for PCT/US2008/067619, Aug. 20, 2008, Rapiscan Security Products.

International Search Report for PCT/US2008/088345, Apr. 3, 2009, Rapiscan Security Products.

MSNBC, "Airports Seek Hi-Tech Security", Apr. 3, 2002.

Murray et al., "Exploitation of X-Ray Technology for the Detection of Contraband-Aviation Security Applications", European Conference on Security and Detection, Apr. 28-30, 1997.

Rapiscan Security Products, Secure 1000 Brochure, 2002.

Rapiscan Security Products, Secure 1000 Concealed Object Detection System, Nov. 1998.

Rapiscan Systems Secure 1000 Case Study, London Heathrow Terminal 4, Fall 2004.

St. Bartholomew's Hospital, Radiation Safety Report on the Rapiscan Secure 1000 X-Ray System, Nov. 4, 2004.

International Search Report for PCT/US11/28411, completed on Sep. 16, 2011; Rapiscan Systems Inc.

International Search Report for PCT/US11/28393, completed on Jun. 29, 2011; Rapiscan Systems Inc.

International Search Report for PCT/US11/28403, completed on Sep. 28, 2011; Rapiscan Systems Inc.

International Search Report for PCT/US11/28413, completed on Jun. 30, 2011; Rapiscan Systems Inc.

* cited by examiner

| ITEM | PART NO. | QTY | MANUF PART NO. | MANF ALT | RECCOM DIST. | DESCRIPTION | UOM |
|---|---|---|---|---|---|---|---|
| 33 | 3094604-2 | 2 | | | | Cable Kit, Cat5e FTP Patch, Lg 1.0M | EA |
| 32 | 3094604-1 | 1 | | | | Cable Kit, Cat5e FTP Patch, Lg 0.5M | EA |
| 31 | 2194604-3 | 1 | | | | Cable Kit, Detector Tower PMT Power, Lg 37 inch | EA |
| 30 | 2194604-1 | 1 | | | | Cable Kit, Detector Tower PMT Power, Lg 20 inch | EA |
| 29 | 2194604-2 | 1 | | | | Cable Kit, Detector Tower PMT Power, Lg 34 inch | EA |
| 28 | 2194604-4 | 1 | | | | Cable Kit, Detector Tower PMT Power, Lg 50 inch | EA |
| 27 | 2194605-1 | 1 | | | | Cable Kit, Coax Detector Tower PMT Data, Lg 20 inch | EA |
| 26 | 2194605-2 | 1 | | | | Cable Kit, Coax Detector Tower PMT Data, Lg 36 inch | EA |
| 25 | 3494885 | 1 | | | | Plug,Connector, Corner Cover | EA |
| 24 | SW08-0000 | 42 | | | | Washer Flat #8 Regular Patte | EA |
| 21 | 8594836 | 22 | | | | Screw 10-32 X 3/4" Lg Soc Button HD,SS | EA |
| 20 | 8594835 | 22 | | | | Bonded Washer #10, AL, W NPR Backed | EA |
| 18 | 8594821 | 17 | | | | Screw Flat Socket Cap 1/4-20 X 1/2" Lg | EA |
| 15 | 8594818 | 6 | | | | Screw Flat Socket Cap 8-32 X 1/2"' Lg | EA |
| 13 | 8510712 | 22 | | | | Washer Lock 10-32 SS | EA |
| 12 | 8510711 | 18 | | | | Washer Flat 10-32 SS | EA |
| 11 | 4094843 | 1 | | | | Connector Closure Cover, Secure 1000 MP | EA |
| 10 | 4094841 | 1 | | | | Connector, Corner Cover, Detector Tower Secure 1000 MP | EA |
| 9 | 4094781 | 1 | | | | PMT Mounting Plate Detector Assy Secure 1000 MP | EA |
| 8 | 5794776 | 12.5 | | | | Seal Detector Assy Secure 1000 MP | EA |
| 7 | 4094775 | 2 | | | | Trim Plate Detector Assy Secure 1000 MP | EA |
| 6 | 4094774 | 2 | | | | Handle, Detector Assy,Secure 1000 MP | EA |
| 5 | 4094773 | 1 | | | | Closure Cover Detector Assy Secure 1000 MP | EA |
| 4 | 4094772 | 1 | | | | Corner Cover Detector Tower Secure 1000 MP | EA |
| 3 | 2394770 | 1 | | | | Detector Tower, Detector Assy, Secure 1000 MP | EA |
| 2 | 2394771 | 4 | | | | PMT Assy Detector Assy Secure 1000 MP | EA |
| 1 | 2294726 | 1 | | | | 4 Channel Card, Detector Assy, Secure 1000 MP | EA |

Table 1

PARTS LIST

PARTS LIST

| ITEM | PART NO. | QTY | MANUF PART NO. | MANF ALT | RECCOM DIST. | DESCRIPTION | UOM |
|---|---|---|---|---|---|---|---|
| 57 | 2194605-4 | 1 | | | | Cable Kit, Coax Detector Tower PMT Data | EA |
| 56 | 2194605-3 | 1 | | | | Cable Kit, Coax Detector Tower PMT Data | EA |
| 55 | 85104498 | 4 | | | | KEP Nut 4-40, 3/32" LG, SS | EA |
| 54 | 85104499 | 4 | | | | Screw, 4-40 X 3/8" LG, SS, PH Pan HD | EA |
| 53 | 85104500 | 1 | | | | Screw, 1/4"- 20x 1 1/2" LG Flat, Soc HD, SS | EA |
| 52 | 85104501 | 1 | | | | KEP Nut 1/4"-20, SS | EA |
| 51 | 21104506 | 4 | | | | Grounding Wire, PMT Boards | EA |
| 50 | 211044476-2 | 2 | | | | Cable Assy, Ground Wire | EA |
| 49 | 211044476-1 | 1 | | | | Cable Assy, Ground Wire | EA |
| 48 | 85104502 | 42 | | | | KEP nut 8-32, 1/8" LG,SS | EA |
| 47 | 85104503 | 18 | | | | KEP Nut 10-32, 1/8" LG, SS | EA |
| 46 | 85104491 | 4 | | | | Screw 6-32 X 1/4" Lg PH Pan HD,SS | EA |
| 45 | 85104497 | 4 | | | | Standoff 6-32 X 3/4" Lg, SS | EA |
| 44 | 31104385 | 14 | | | | Cable Tie, Mounting Base, Aluminum | EA |
| 43 | 34104374 | 1 | | | | Protection Cap Communication Com | EA |
| 42 | SF10-3208 | 12 | | | | Screw, FHPS 10-32, 1/2" LG | EA |
| 41 | 31104262 | 8 | | | | Clamp, HV Cable Assy, Secure 1000MP | EA |
| 40 | 8800010 | 1 | | | | Label Earth | EA |
| 39 | 8800015 | 2 | | | | Label High Voltage Warning | EA |
| 38 | 8594887 | 8 | | | | Screw Flat Socket Cap 8-32 X 1.0" Lg | EA |
| 37 | 2994867 | 1 | | | | Firmware, 4 ChannelBoard, Detector Assy | EA |
| 36 | 2994866 | 1 | | | | Firmware, Communication, Detector Assy | EA |
| 35 | 2194619 | 1 | | | | Cable Assy, PWR & Data Tower | EA |
| 34 | 30946604-3 | 1 | | | | Cable Kit, Cat5e FTP Patch, Lg 2.0M | EA |

Table 2

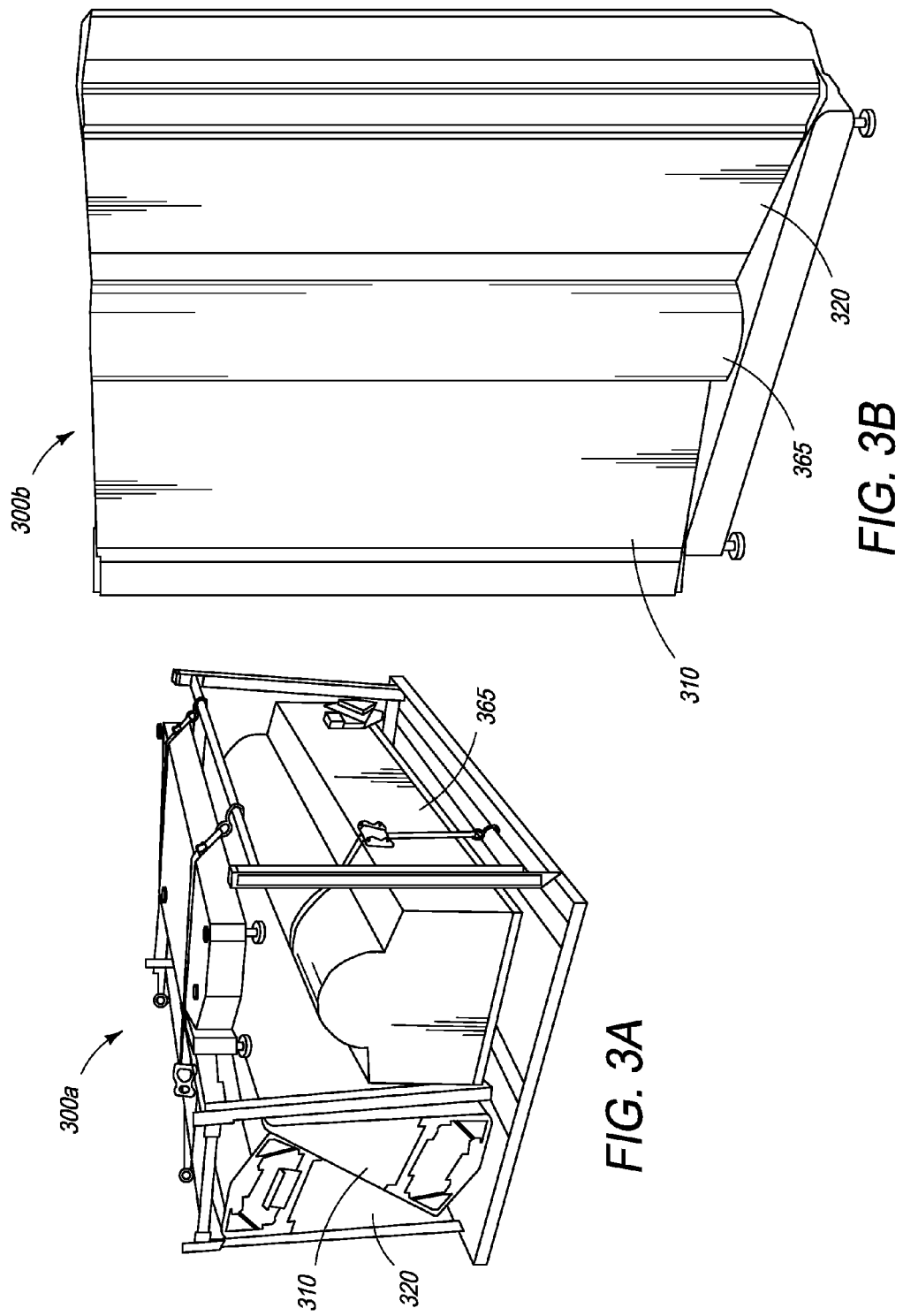

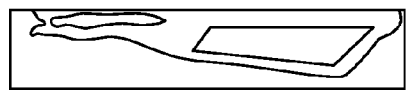
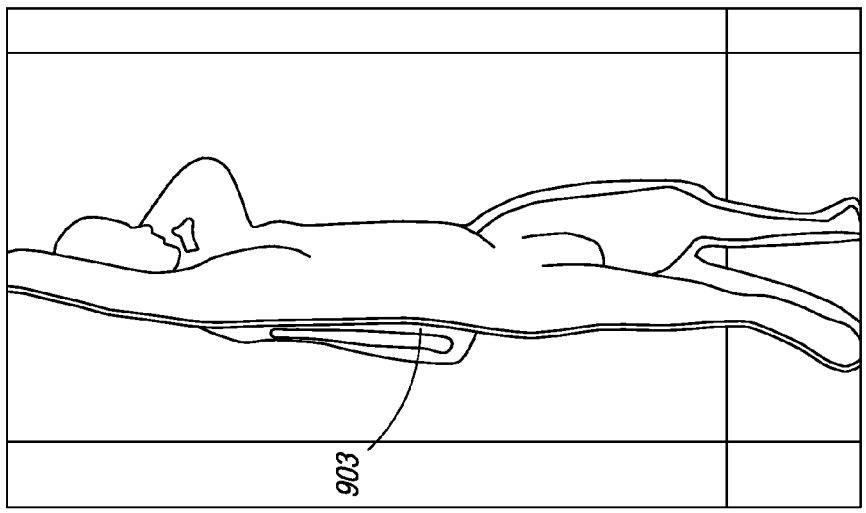
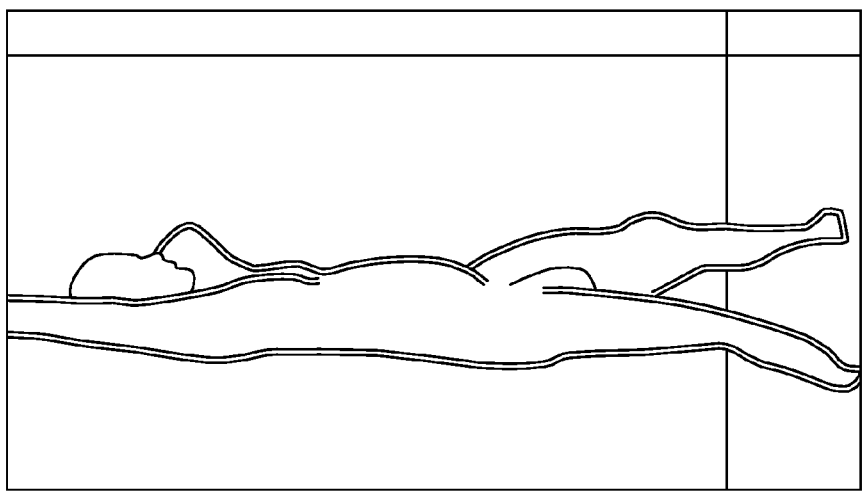

PERSONNEL SCREENING SYSTEM

CROSS-REFERENCE TO RELATED APPLICATIONS

The present application relies on U.S. Provisional Patent Application No. 61/313,772, filed on Mar. 14, 2010, for priority, which is herein incorporated by reference in its entirety.

The present application also relies on U.S. Provisional Patent Application No. 61/423,585, filed on Dec. 15, 2010, for priority, which is herein incorporated by reference in its entirety.

In addition, the present application relies on U.S. Provisional Patent Application No. 61/423,582, filed on Dec. 15, 2010, for priority, which is herein incorporated by reference in its entirety.

In addition, the present application relies on U.S. Provisional Patent Application No. 61/423,586, filed on Dec. 15, 2010, for priority, which is herein incorporated by reference in its entirety.

Further, the present application is a continuation-in-part of U.S. patent application Ser. No. 12/887,510, entitled "Security System for Screening People" and assigned to the applicant of the present invention, which is a continuation of U.S. Pat. No. 7,826,589, of the same title and also assigned to the applicant of the present invention, both of which are herein incorporated by reference in their entirety.

Further, the present application is a continuation-in-part of U.S. patent application Ser. No. 12/849,987, entitled "Personnel Screening System with Enhanced Privacy" and assigned to the applicant of the present invention, which is a continuation of U.S. Pat. No. 7,796,733, of the same title and also assigned to the applicant of the present invention, both of which are herein incorporated by reference in their entirety.

FIELD OF THE INVENTION

The present specification relates generally to security systems for screening threats contained on persons, and specifically, to a personnel screening system that comprises modular components for improved portability, and more specifically, to compact and portable detector towers.

BACKGROUND OF THE INVENTION

Radiation based systems for screening people and in use today at transit points, such as airports, courthouses, etc., are generally portal systems that are bulky and not conducive for portable applications. Unfortunately, such prior art screening systems are not compact enough (example, have heavy back-end cables and wires for connecting the photomultiplier tubes to a centralized analog-to-digital conversion and power station) and are often difficult and time-consuming to use and/or transport.

Also, security systems are presently limited in their ability to detect contraband, weapons, explosives, and other dangerous objects concealed under clothing. Metal detectors and chemical sniffers are commonly used for the detection of large metal objects and certain types of explosives, however, a wide range of dangerous objects exist that cannot be detected using these devices. Plastic and ceramic weapons increase the types of non-metallic objects that security personnel are required to detect. Manual searching of subjects is slow, is inconvenient, and would not be well tolerated by the general public, especially as a standard procedure in high traffic centers, such as at airports.

Known prior art X-ray systems for detecting objects concealed on persons have limitations in their design and method that prohibit them from achieving low radiation doses, which is a health requirement, or prevent the generation of high image quality, which are prerequisites for commercial acceptance. An inspection system that operates at a low level of radiation exposure is limited in its precision by the small amount of radiation that can be directed towards a person being searched. X-ray absorption and scattering further reduces the amount of X-rays available to form an image of the person and any concealed objects. In prior art systems this low number of detected X-rays has resulted in unacceptably poor image quality.

This problem is even more significant if an X-ray inspection system is being used in open venues such as stadiums, shopping malls, open-air exhibitions and fairs, etc. At such venues, people can be located both proximate to and/or at a distance from the machine. If a person being scanned is not very close to the X-ray machine, the resultant image may not be clear enough since the amount of radiation reaching the person is very low. This limits the range of scanning of the system to a few feet from the front of the machine. If, however, a person being scanned is too close to the X-ray machine, the amount of radiation impinging on the person may not be safe.

Therefore, there is a need for a compact radiographic detector/source screening system that has improved detection efficiency, is light yet sufficiently rugged and can be easily unassembled for transportation and then is simple to reassemble at a site. There is also a need for the radiographic screening system that provides good resolution as well as large range of view and fast scanning speed, while keeping the radiation exposure within safe limits. That is, the system should not only be safe for people at close distances, but also provide a good resolution and penetration at standoff distances.

SUMMARY OF THE INVENTION

In one embodiment, the present specification discloses an inspection system for detecting objects being carried by a person, wherein said person is moving along a plane defined by a Z axis and a Y axis, the inspection system comprising: a) a first detection system configured to detect radiation scattered from said person as the person moves along the Y axis of the plane, wherein said first detection system comprises a first planar surface positioned opposite to the plane, and configured to generate electronic signals responsive to the detected radiation; b) a second detection system configured to detect radiation scattered from said person as the person moves along the Y axis of the plane, wherein said second detection system comprises a second planar surface positioned opposite to the plane, and configured to generate electronic signals responsive to the detected radiation; c) an X-ray source positioned between said first detection system and said second detection system, wherein said X-ray source is configured to generate a beam spot pattern along the Z axis of the plane and wherein said X-ray source does not generate beams that move along the Y axis of the plane; and d) a processing system for analyzing the electronic signals generated by the first detection system and the second detection system and for generating an image on a display.

Optionally, the X-ray source is coupled with a beam chopper and wherein said beam chopper operates to produce a scanning pencil beam of X-rays along the Z axis. The beam chopper does not produce a scanning pencil beam of X-rays along the Y axis. In one embodiment, the beam chopper comprises a chopper wheel having three slits and wherein each slit positioned 120 degrees apart from an adjacent slit. The slits are aligned with at least two parallel collimator slits and wherein X-rays emitted from the X-ray source conically illuminate the collimator slits to generate at least two parallel scanning beams interleaved in time. In another embodiment, the beam chopper comprises a hollow cylinder having at least one helical aperture. The scanning pencil beam has a linear scan velocity and wherein said linear scan velocity is varied or kept constant by modifying a pitch and roll of at least one of said helical apertures. The scanning pencil beam has a spot size and wherein said spot size is varied or kept constant by modifying an aperture width of at least one of said helical apertures.

Optionally, the first detection system is contained within a first enclosure, wherein said first enclosure has a first width extending from one end of said first enclosure to an opposing end of said first enclosure and wherein the planar surface extends along the entire first width. The second detection system is contained within a second enclosure, wherein said second enclosure has a first width extending from one end of said second enclosure to an opposing end of said second enclosure and wherein the planar surface extends along the entire first width. The first enclosure is physically separate from, and independent of, said second enclosure. The X-ray source is contained within a third enclosure and wherein the third enclosure is physically separate from, and independent of, the first and second enclosures.

Optionally, each of the first, second, and third enclosures weigh less than 88 pounds. The third enclosure may be detachably connected to the first enclosure and the second enclosure. Each of the first, second, and third enclosures may be detachably connected to a frame. The beam chopper comprises a disk chopper that is configured to be rotated by a motor. The speed of the chopper wheel is dynamically controlled by a controller to optimize a scan velocity of an X-ray beam. The first enclosure comprises a) a first side defined by a planar surface having an exterior surface facing the person and an interior surface, wherein the first side is configured to receive the radiation scattered from the person; b) a second side in an acute angular relationship with said first side, wherein said second side is defined by a planar surface having an interior surface adapted to receive radiation passing through the first side and wherein said second side is configured to only receive radiation after it passes through said first side; c) a first substrate positioned on the interior surface of the first side, wherein the first substrate further comprises an active area for receiving and converting said radiation into light; d) a second substrate positioned on the interior surface of the second side, wherein the second substrate further comprises an active area for receiving and converting said radiation into light; and e) at least one photodetector having a light responsive area and a non-light responsive area, wherein the light responsive area is positioned to receive the light emitted from the first substrate and the second substrate.

Optionally, the radiation comprises X-ray photons and wherein said first substrate detects 30-60% of the X-ray photons impinging on said first side. The second substrate detects 10-30% of the X-ray photons impinging on said first side. The inspection system further comprises a conveyor for enabling a standing or sitting person to move along the plane. The generated image comprises 480 rows, 160 columns, and 8 bits per pixel. The X-ray source generates a beam spot pattern along the Z axis of the plane by pivoting from a first point to a second point and wherein said pivoting is centered around a predefined point of rotation. The X-ray source and a beam chopper are coupled to a surface configured to tilt vertically in relation to a guide member and in response to a motor.

In another embodiment, the present specification discloses a method for detecting threatening objects concealed on body of person by using an inspection system comprising at least one radiation source to produce a scanning pencil beam of X-rays, wherein said scanning pencil beam has a path, and a detector arrangement comprising at least a first detector enclosure having a first surface and a second detector enclosure having a second surface, the method comprising the steps of: a) having the person move past the at least one radiation source in a plane perpendicular to the beam path of the scanning pencil beam and parallel to said first surface and second surface; b) generating an X-ray beam within an radiation source enclosure, wherein the radiation source comprises an X-ray source coupled with a beam chopper and wherein the scanning pencil beam is collimated by at least one slit in the radiation source enclosure to generate a vertical beam spot pattern and not a horizontal beam spot pattern; c) detecting radiation scattered by the person in at least one of the first detector enclosure or second detector enclosure; and d) processing the detected radiation to generate a two dimensional image, wherein said image displays any concealed explosive material being carried by the person.

Optionally, the beam chopper comprises a chopper assembly having a hollow cylinder with helical slits extending along a length of the cylinder, a carbon fiber cylinder covering the hollow cylinder, and a polyethylene epoxy cylinder covering the carbon fiber cylinder. The chopper assembly is rotated by a magnetic bearing assembly comprising a magnetic rotor and a magnetic bearing stator and wherein the magnetic bearing assembly provides magnetic levitation for the chopper assembly at least during power-up and power-down states of the beam chopper.

Optionally, the X-ray source is coupled to a vertical elevating mechanism wherein said elevating mechanism is coupled to a weight configured to counterbalance the X-ray source. The X-ray source is coupled to a vertical elevating mechanism wherein said elevating mechanism is coupled to at least one lifting belt. The X-ray source is coupled to a vertical elevating mechanism wherein said elevating mechanism is coupled to a gear reducer and motor and is not coupled to a counterbalancing weight.

In another embodiment, the present specification discloses a method for manufacturing an inspection system, comprising: a) receiving at least one container, wherein said at least one container comprises a first detection system configured to detect radiation scattered from a person as the person moves along a path, wherein the first detection system is contained within a first enclosure; a second detection system configured to detect radiation scattered from the person as the person moves along the path, wherein the second detection system is contained within a second enclosure; an X-ray source positioned between said first detection system and said second detection system, wherein said X-ray source is configured to generate a vertical beam spot pattern and wherein the X-ray source is contained within a third enclosure having an angled left side and an angled right side; b) attaching said first enclosure to the angled left side of the third enclosure; and c) attaching said second enclosure to the angled right side of third enclosure. Stated differently, the X-ray source is configured to generate a vertical beam spot pattern and does not generate beams that move horizontally or configured such that the source is constrained to generating a beam spot that moves up and down (vertically) but does not move side to side (horizontally).

Optionally, the first, second, and third enclosures are each physically separate from, and independent of, each other. Each of the first, second, and third enclosures weigh less than 88 pounds. Each of the first, second, and third enclosures are detachably connected to a frame.

As further discussed below, the system can be configured with two systems opposing each other and defining a pathway for a person to walk through and an inspection volume. In one embodiment, the detection system and X-ray system enclosures are configured with hinged doors which open into the inspection volume and which do not open behind the systems, thereby decreasing the required footprint of the systems.

BRIEF DESCRIPTION OF THE DRAWINGS

These and other features and advantages of the present invention will be appreciated, as they become better understood by reference to the following detailed description when considered in connection with the accompanying drawings, wherein:

FIG. 2G shows Table 1 comprising a first set of bill-of-materials with reference to corresponding item numbers marked in the views of FIGS. 2A through 2F;

FIG. 2H shows Table 2 comprising a second set of bill-of-materials with reference to corresponding item numbers marked in the views of FIGS. 2A through 2F;

FIG. 3A is an unassembled and packaged illustration of an exemplary modular X-ray backscatter system configuration, including detection system and towers, for the personnel screening system of the present invention;

FIG. 3B is an assembled illustration of the exemplary modular X-ray backscatter system configuration shown in FIG. 3A;

FIG. 9A is an image obtained from using a segmentation algorithm in accordance with one embodiment of the present invention;

FIG. 9B is an image obtained from using a segmentation algorithm in accordance with one embodiment of the present invention;

FIG. 9C is a close view of the segmented object from the image shown in FIG. 9b using a segmentation algorithm in accordance with one embodiment of the present invention;

DETAILED DESCRIPTION OF THE INVENTION

Figure 1:
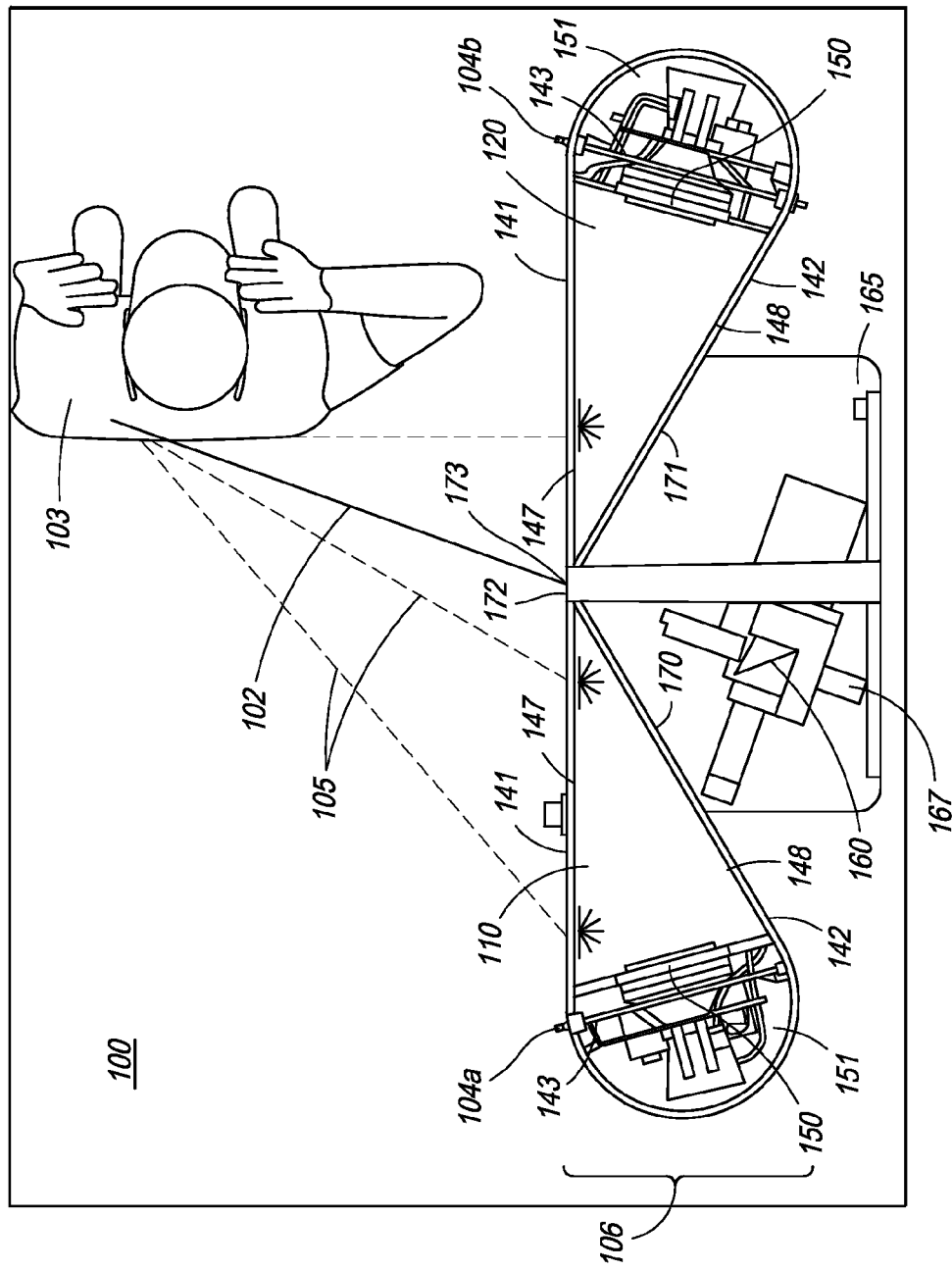
FIG. 1 illustrates an exemplary X-ray backscatter system configuration, including a detection system and towers, for the screening system of the present invention.

The present specification is directed towards personnel screening systems comprising modular components, including detector and source units. The modular components of the present invention allow for compact, light and yet sufficiently rugged overall structure that can be disassembled for ease of transportation and is also simple to reassemble at a required site for inspection. The novel modular architecture of the screening system of the present invention also allows for the modular components to be fabricated separately and be quickly snapped on for assembly. Similarly, the modular components can be easily disassembled for ease of service access to the selective components and/or for packaging for subsequent transportation.

The present specification is also an improved method for screening individuals at security locations without exposing individuals to high radiation and retaining the efficiency of the screening process. The disclosed system allows for maximum threat detection performance and image clarity irrespective of the distance of the individuals from the screening system.

In one embodiment, a radiographic image is formed using any available radiation imaging technique for "body imaging" such as, but not limited to X-ray scattering, infrared imaging, millimeter wave imaging, RF imaging, radar imaging, holographic imaging, CT imaging, and MRI. Any "body imaging" system that has the potential for displaying body detail may be employed. In one embodiment, any photodetectable radiation or any radiation source with a light beam may be employed in the present invention.

In one embodiment, the system of present invention requires a subject under inspection to assume only one position and uses a single source with a single group of detectors, circuits and processor to generate two separately processed scanning beams and associated images.

In one embodiment, the system of present invention is a walk-through inspection system that uses a single source with a single group of detectors, circuits and processor to generate two separately processed scanning beams and associated images.

In another embodiment, the system operates in a dual-source mode but uses a single group of detectors, circuits and processor.

The system allows for detection of threats by efficient imaging of explosive materials such as dynamite, C-4, as well as ceramics, graphite fibers, plastic containers, plastic weapons, glass vials, syringes, packaged narcotics, bundled paper currency, and even wooden objects.

In X-ray backscatter systems for detecting concealed objects, a pencil beam of X-rays traverses over the surface of the body of a person being examined. X-rays that are scattered or reflected from the subject's body are detected by a detector such as, for example, a scintillator and photomultiplier tube combination. The resultant signal produced by the X-ray detector is then used to produce a body image, such as a silhouette, of the subject and any concealed objects carried by the subject.

In one embodiment, the X-ray backscatter imaging system of the present invention is designed such that it is optimized for near-real time imaging of people or objects with an interrogating radiation beam, while they are in motion. The system is also capable of automatically detecting threats by processing detection algorithms on the image data in near real-time.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

FIG. 1 illustrates an exemplary X-ray backscatter system configuration for the novel modular screening system 100 of the present invention. Referring to FIG. 1, an X-ray source 160 is enclosed in a modular housing 165 and is employed to generate a narrow pencil beam 102 of X-rays directed towards the subject under inspection 103.

In one embodiment, pencil beam 102 is formed with the integration of an X-ray tube and a beam chopping mechanism 167. The pencil beam 102 is rastered either horizontally or vertically across the subject. This rastering is the result of the beam chopping mechanism by only allowing a minimal exit aperture for the x-ray beam to project. If a chopper wheel is employed, as described below, the exit aperture is 1 mm in diameter resulting in a X-ray beam that has diverged to about 7 mm. In one embodiment, subject 103 is a human. As the target (person being scanned) 103 poses in front of or walks by the screening system 100, the resultant pencil beam 102 hits the target, whereby at least a portion of the X-rays are backscattered. Exemplary embodiments of beam chopping mechanism 167 are described in greater detail below.

It should be understood to those of ordinary skill in the art that any number of ionizing radiation sources may be used, including but not limited to gamma radiation, electromagnetic radiation, and ultraviolet radiation. Preferably the X-ray energies employed are between 30 kV and 100 kV.

In one embodiment, sensors 104a and 104b are employed to detect the presence of a person as he or she poses in front of or walks through the screening system.

At least a portion of the scattered X-rays 105 impinges upon detector arrangement 106. In one embodiment, detector arrangement 106 in the screening system of the present invention comprises first and second detector enclosures 110 and 120 for enabling detection. In one embodiment, first and second detector enclosures 110 and 120 are embodied in the form of modular detector towers, which comprise at least one scintillator screen. In another embodiment, first and second detector enclosures 110 and 120 are modular detector towers that comprise at least two detector screens. In alternate embodiments, the detector enclosures may comprise any number of arrangements including, but, not limited to a plurality of detector screens. U.S. patent application Ser. No. 12/262,631, entitled "Multiple Screen Detection System" and assigned to the applicant of the present invention, is herein incorporated by reference. In addition, U.S. Provisional Patent Application No. 61/313,733, entitled "Multiple Screen Detection Systems" and filed on Mar. 14, 2010, is herein incorporated by reference in its entirety.

As shown in FIG. 1, detector towers 110 and 120 each comprise first side area 141, second side area 142, and third side area 143 that are connected to each other at an angle to form a triangular cross-section. The first side area 141 comprises screen 147 and faces subject 103 under inspection. The second side area 142 comprises a second screen 148 in the interior of the towers. In one embodiment, screens 147, 148 are relatively thick $CaWO_4$ scintillator screens that have a relatively short decay time of 10 microseconds that allows for the rapid scanning of the radiation beam with minimal image degradation. The $CaWO_4$ screen, in one embodiment, is capable of detecting approximately 70% of the backscattered or transmitted radiation, and thus, produces approximately 250 usable light photons per 30 keV X-ray. Additionally, the use of a thicker screen enables the detection of more of the radiation incident upon the detector at the expense of lower light output. In one embodiment, the areal density of the screen is 80 milligrams per square centimeter.

In one embodiment, to fasten the detector towers to the base, large diameter shoulder bolts are pre-fastened to the base, such that the detector towers can be "twisted" and locked onto the base. Once the radiation source and housing is attached to the base, the detector towers cannot be moved and twisted off. Radiation housing area 165 comprises first angled side 170 and second angled side 171 such that they easily abut and coincide with the sides 142 of the detector towers 110 and 120, when the detector towers and the radiation source housing are integrated or assembled together. A front-end side strip 172 facing the subject 103 comprises an opening 173 through which X-ray beam 102 passes before striking subject 103. Limited opening 173 aids in the reduction of electromagnetic interference and radiation noise. The side strip 172 also acts as a separator for the two detector towers such that the two detector towers are assembled symmetrically around incident X-ray pencil beam 102 to detect backscattered X-rays 105 and provide an electronic signal characteristic of the X-ray reflectance.

In one embodiment, the detector towers 110 and 120 are spaced apart by the strip 172 such that the chopper wheel or other beam collimation means is in the middle of the two towers. The two towers 110, 120 are separated by a distance 'd', that in one embodiment ranges from ½ to 2 times the diameter of the chopper wheel. The distance 'd' defines the field of view for the X-ray source and is optimized for a sufficient field of view while preventing overexposure of the detectors.

According to one embodiment of the present invention, detector towers 110, 120 and radiation housing 165 are of composite walls or any other similar non-conductive material evident to those of ordinary skill in the art that provides an optimization of a sturdy yet light overall structure. Specifically, housing the back-end electronics, wires and cables associated with the photomultipliers and radiation source within composite walls creates a Faraday cage, thus substantially reducing electromagnetic interference.

In an embodiment of the present invention, detector towers 110, 120 also comprise lighting means, such as LEDs, on the periphery or any one of the edges of the front area 141 for illumination depicting that the screening system is on and/or screening is in progress. Each of the towers 110, 120 comprises photomultiplier tubes 150 that are placed in the interior of the towers proximate to third side area 143. The back-end electronics of the photomultiplier tubes 150 is housed in the substantially semi-circular housing 151.

Figure 2A:
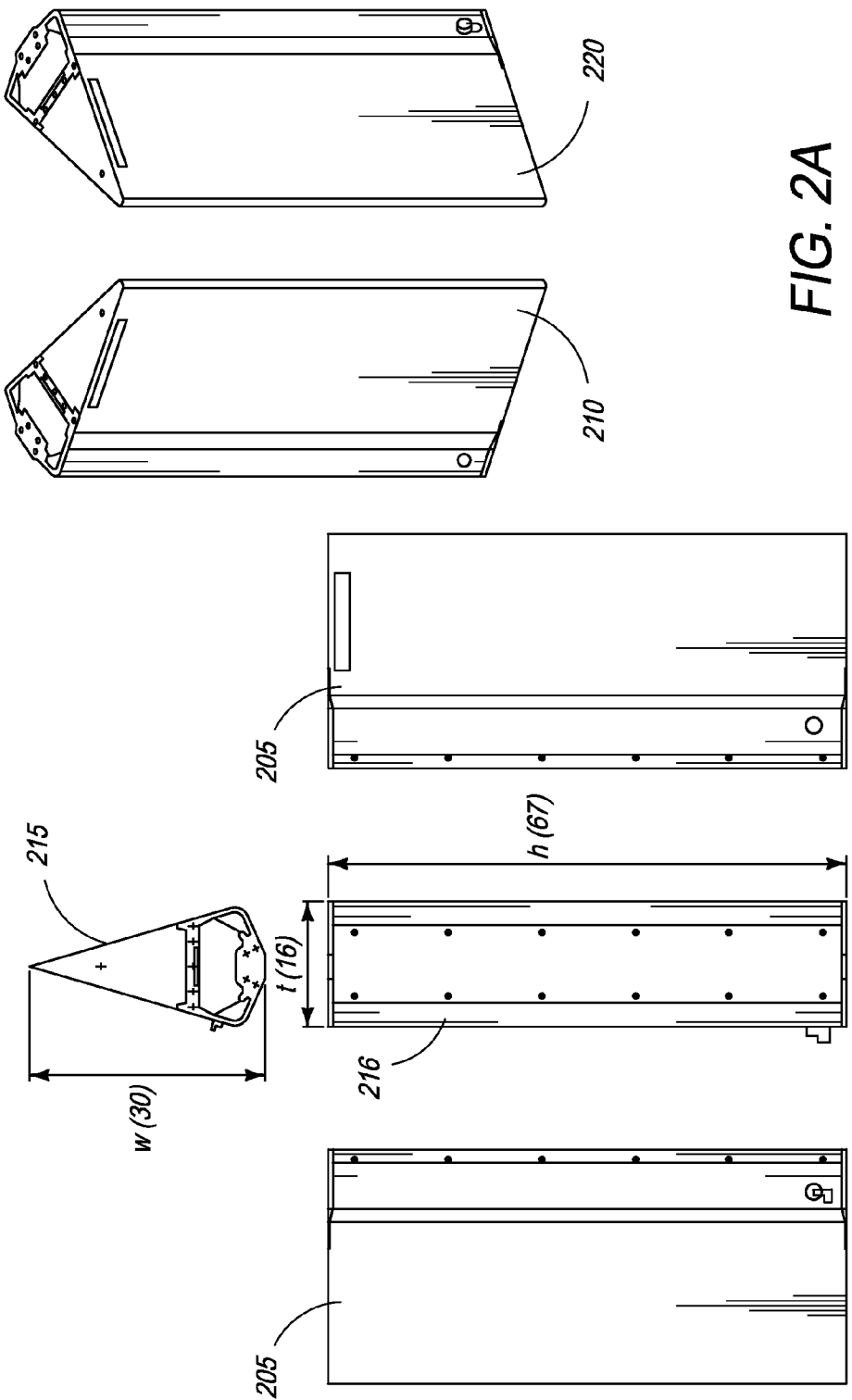
FIG. 2A shows multiple views of the detector towers in accordance with an embodiment of the present invention.

FIGS. 2a through 2f show structural details of the detector towers in accordance with one specific embodiment of the present invention. FIGS. 2g and 2h show the bill-of-materials with reference to corresponding item numbers marked in the views of FIGS. 2a through 2f. Specifically, FIG. 2a shows perspective views of identical detector towers 210 and 220 along with their respective front views 205, top view 215 and side view 216. In one embodiment, the towers have a height 'h' of 67 inches, lateral width 'w' of 30 inches and maximum thickness "t" of 16 inches.

Figure 2B:
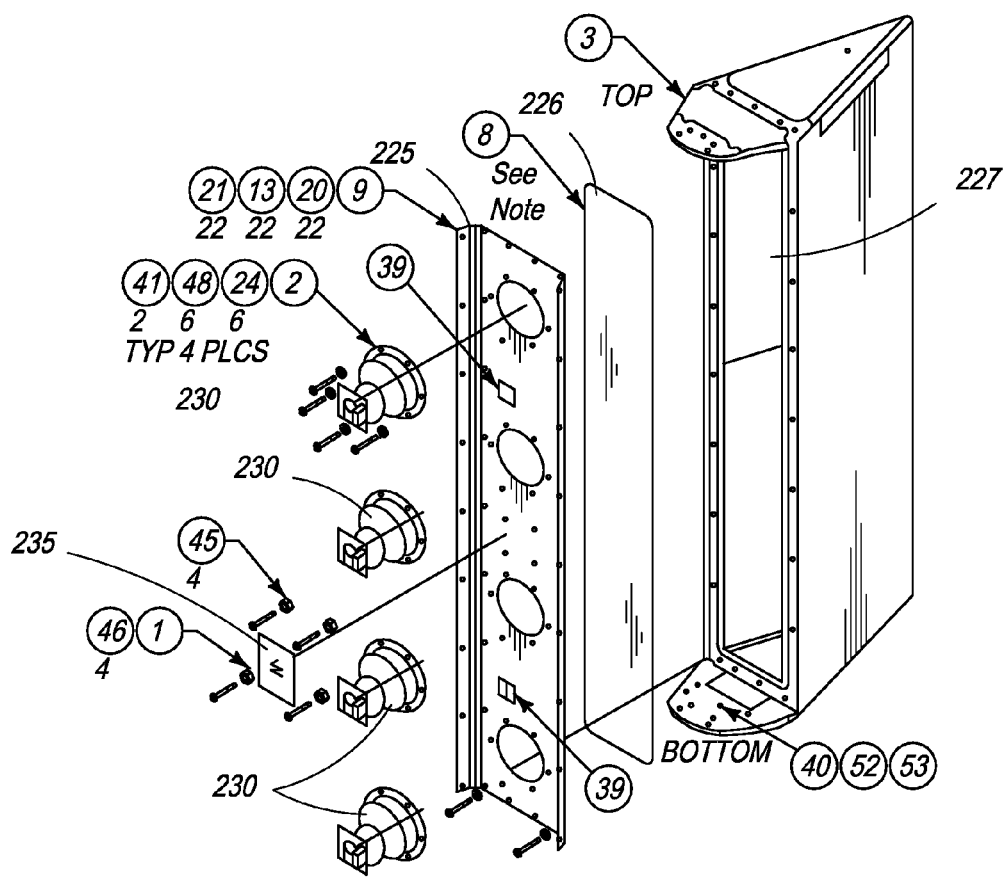
FIG. 2B shows an exploded view of the photomultiplier tubes, mounting plate and signal processing card.
Figure 2C:
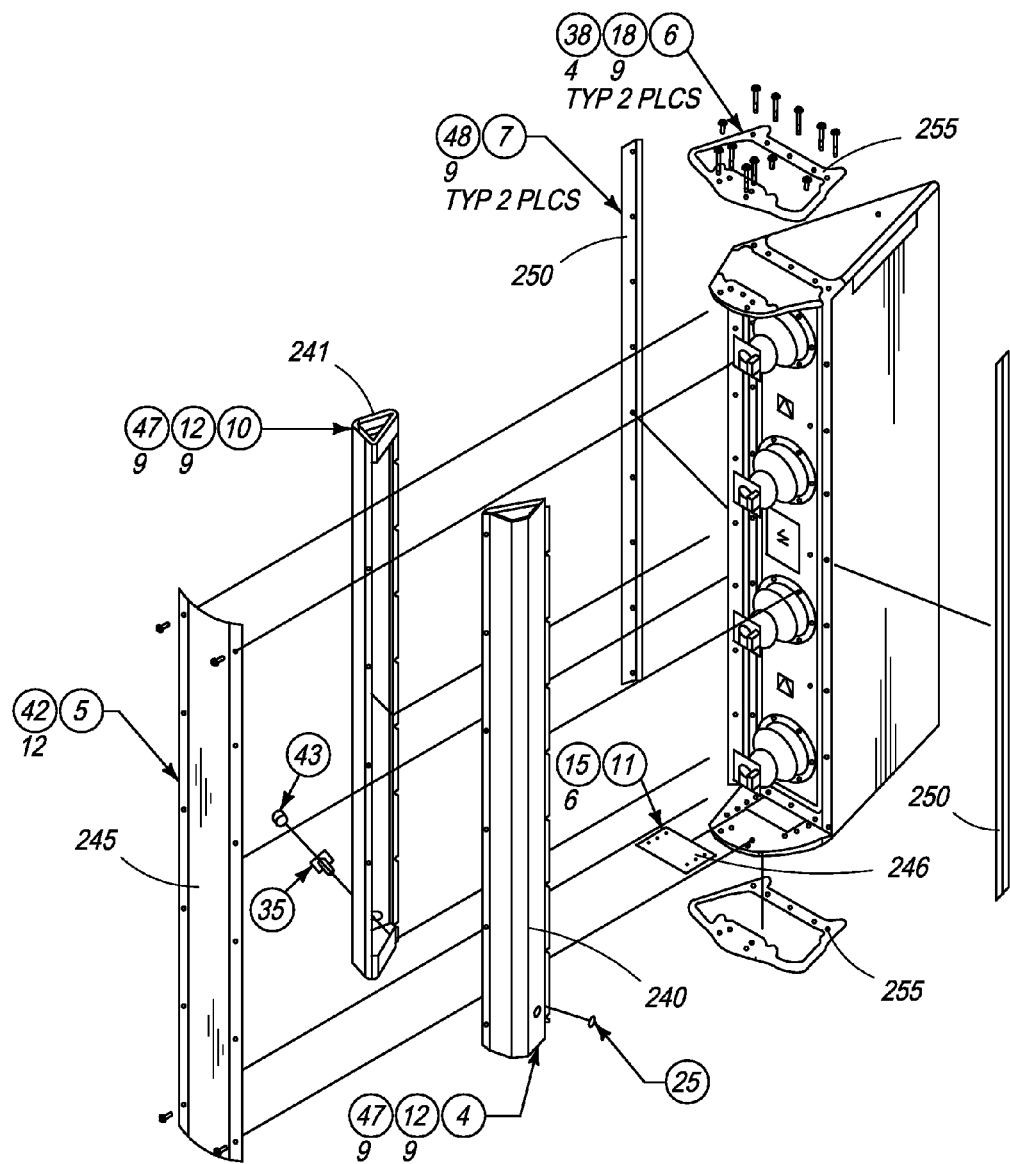
FIG. 2C shows an exploded view of the structures that cover the assembly of the photomultiplier tubes, mounting plate and signal processing card within the detector tower.
Figure 2D:
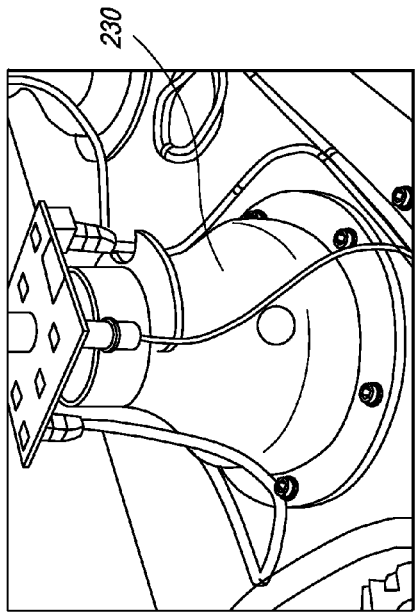
FIG. 2D shows a photomultiplier tube assembly in accordance with an embodiment of the present invention.
Figure 2E:
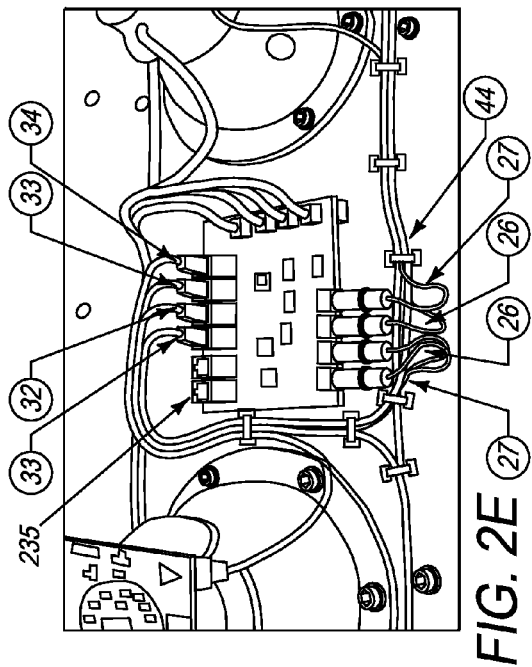
FIG. 2E shows a signal processing board in accordance with an embodiment of the present invention.

Referring now to exploded views of the detector towers in FIGS. 2b and 2c, simultaneously, the mounting plate 225 is shown as "broken-away" and separate from the four photomultiplier tube assemblies 230 that are mounted on the plate 225 when assembled. In accordance with an embodiment of the present invention, back-end electronics of the photomultiplier tubes 230 comprises a signal processing board 235 co-located on the mounting plate 225 in proximity to the photomultiplier tubes. FIG. 2d provides a more detailed view of the photomultiplier assembly 230 while FIG. 2e shows a detailed view of the signal processing board 235 that in this embodiment is a four-channel card corresponding to the four photomultiplier tubes.

Figure 2F:
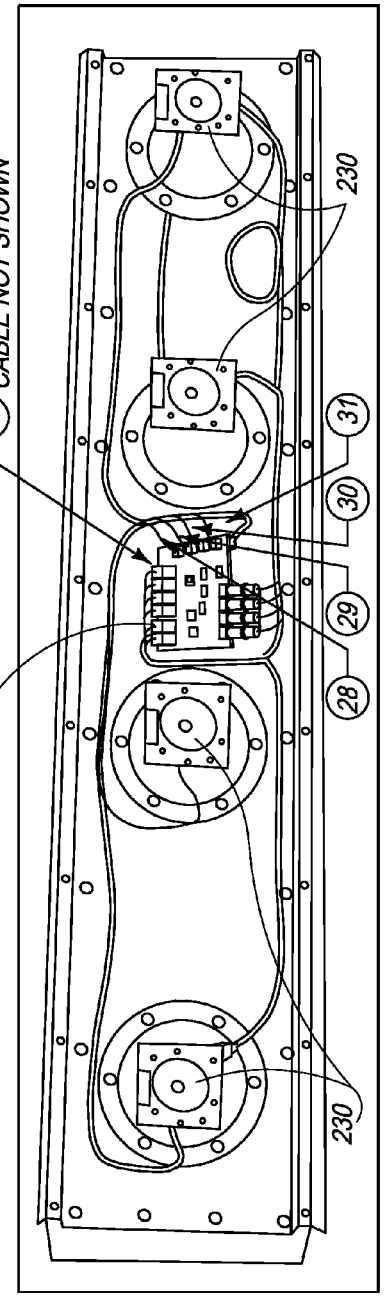
FIG. 2F shows the wiring connections of four photomultiplier tubes with the signal processing board.

At least one analog to digital conversion card and a power supply module is mounted on the signal processing board 235. The power supply module applies an operating voltage to the photomultiplier tubes while the analog to digital conversion card converts pulse current output from the photomultiplier tubes into digital signals for further processing. Conventionally, massive cables are employed to connect the photomultiplier tubes with a central analog-to-digital converter and power station located at a distance from the photomultiplier tubes. By having power supply as well as analog-to-digital converter closer to the photomultiplier tubes, smaller wires are needed thereby also reducing signal transient noise and improving the overall signal-to-noise ratio (SNR). Similarly, FIG. 2f shows wiring connections of the four photomultiplier tubes 230 with the signal processing board 235.

Referring again to FIGS. 2b and 2c, simultaneously, a seal 226 allows the assembly comprising mounting plate 225, photomultipliers 230 and signal processing board 235 to fit tightly into the corresponding tower premise 227. An interconnectable set of structures cover, both protect and allow easy access when needed to the photomultiplier tubes located on the mounting plate assembly. These set of structures comprise a corner cover 240 with a connector corner cover 241; a closure cover 245 with a corresponding connector 246; two trim side plates 250 and top and bottom handle frames 255.

Referring back to FIG. 1, in one embodiment, the inspection system 100 has modular components that can be disassembled for mobility and ease of transportation and reassembled again at the site of interest. Thus, the teardrop-shaped detector towers 110, 120 and the radiation source housing 165 with associated electronics and cables are manufactured as separate modules or cabinets that can be integrated quickly to form the system 100. The novel teardrop modular architecture enables a compact and light overall system 100.

FIG. 3a shows a disassembled view 300a of the screening system of the present invention such that its modular components, such as detector towers 310, 320 along with radiation source housing 365, are unassembled and packaged for ease of transportation. For example, the triangular cross-section of detector towers 310, 320 enables these to be packaged abutting each other in a way that requires minimal space for transportation. FIG. 3b shows an assembled view 300b of the screening system that has been constructed from the transportable package 300a of FIG. 3a. The modular components or cabinets of the screening system of the present invention are designed such that they have simple and intuitive points of connection, such as being able to be fastened to each other, via snap buttons, for quick assembly. In one embodiment, it takes less than 30 minutes to assemble/deploy the screening system from its transportable, packaged condition. In one embodiment, it takes approximately 15 to 30 minutes to assemble/deploy the screening system from its transportable, packaged condition. In one embodiment, the assembly/deployment time is dependent upon whether the unit must be heated or cooled to bring the unit to safe operating temperatures.

Figure 4:
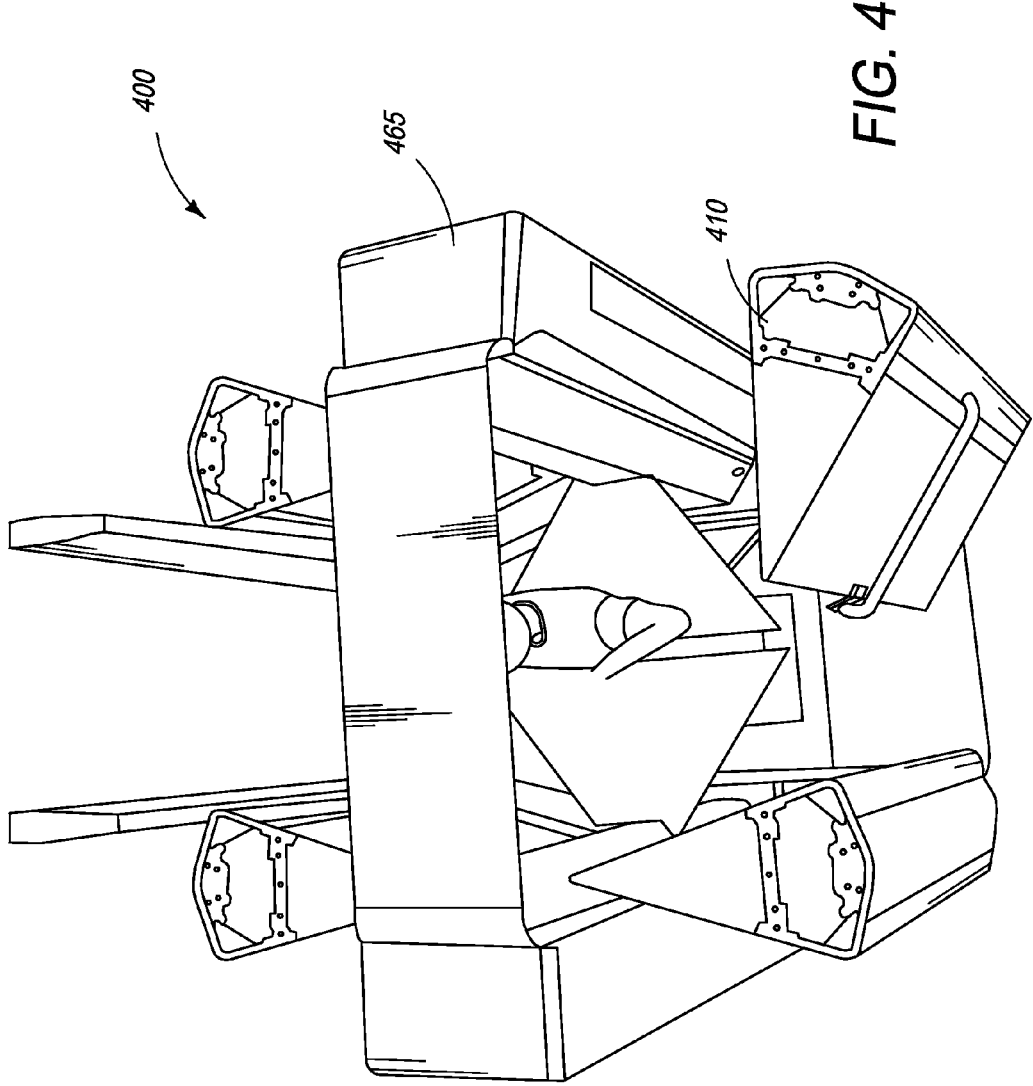
FIG. 4 illustrates a detector tower pulled apart from the radiation housing for ease of service access to the modular components of the screening system of the present invention.

Persons of ordinary skill in the art should appreciate that the modular components design of the screening system of the present invention also facilitates ease of service access for repair and maintenance. For example, FIG. 4 shows an assembled/deployed view 400 of the screening system of the present invention with detector tower 410 being pulled away from the radiation housing 465 for service access to the housing 465 and/or for selective repair and maintenance of the tower 410.

In one embodiment of the present invention, in order to obtain 2D images of scattered radiation, detector systems make use of a dual-axis scanning beam. Referring back to FIG. 1, during operation, as the subject 103 walks-by or stands in front of the detector towers 110, 120 a part of the pencil beam 102 of X-rays that strikes the subject 103 are back-scattered, as rays 105 due to Compton scattering and impinge on the first screen 147 at the front side area 141 of the detector towers. While a portion of the scattered X-rays are detected by the first screen 147, some portion of theses get transmitted through the first screen 147 without being detected and impinge on the second screen 148 (at side 142) in the interior of the detector towers. In one embodiment approximately 40% of the X-ray photons impinging the first screen 147 are detected by it while approximately 24% of the remaining X-ray photons are detected by the second screen 148. It should be noted that these percentages may change, depending upon the energy of the x-rays and the thickness of the scintillator screen.

The photomultiplier tubes 150 generate electronic signals in response to detected rays that are initially converted into light. The light emitted by scintillation at screens 147, 148 is bounced around the triangular enclosures/towers 110, 120 until captured with the photomultiplier tubes 150.

The electronic signals produced by the two detector towers 110, 120 are directed to a processor. The processor analyzes the received signals and generates an image on a display means. The intensity at each point in the displayed image corresponds to the relative intensity of the detected scattered X-rays as the beam is rastered across the subject. In one embodiment, X-ray source 160 communicates synchronization signals to the processor. The processor analyzes the detected signals and compares them to the synchronization signals to determine the display image. In one embodiment, display means is a monitor and is employed to display graphical images signaled by the processor. Display means can be any display or monitor as commonly known in the art, including a cathode ray tube monitor, an LCD monitor or an LED monitor. In one embodiment, the digitized scatter image displayed by display means preferably consists of 480 rows by 160 columns with 8 bits per pixel.

Figure 8:
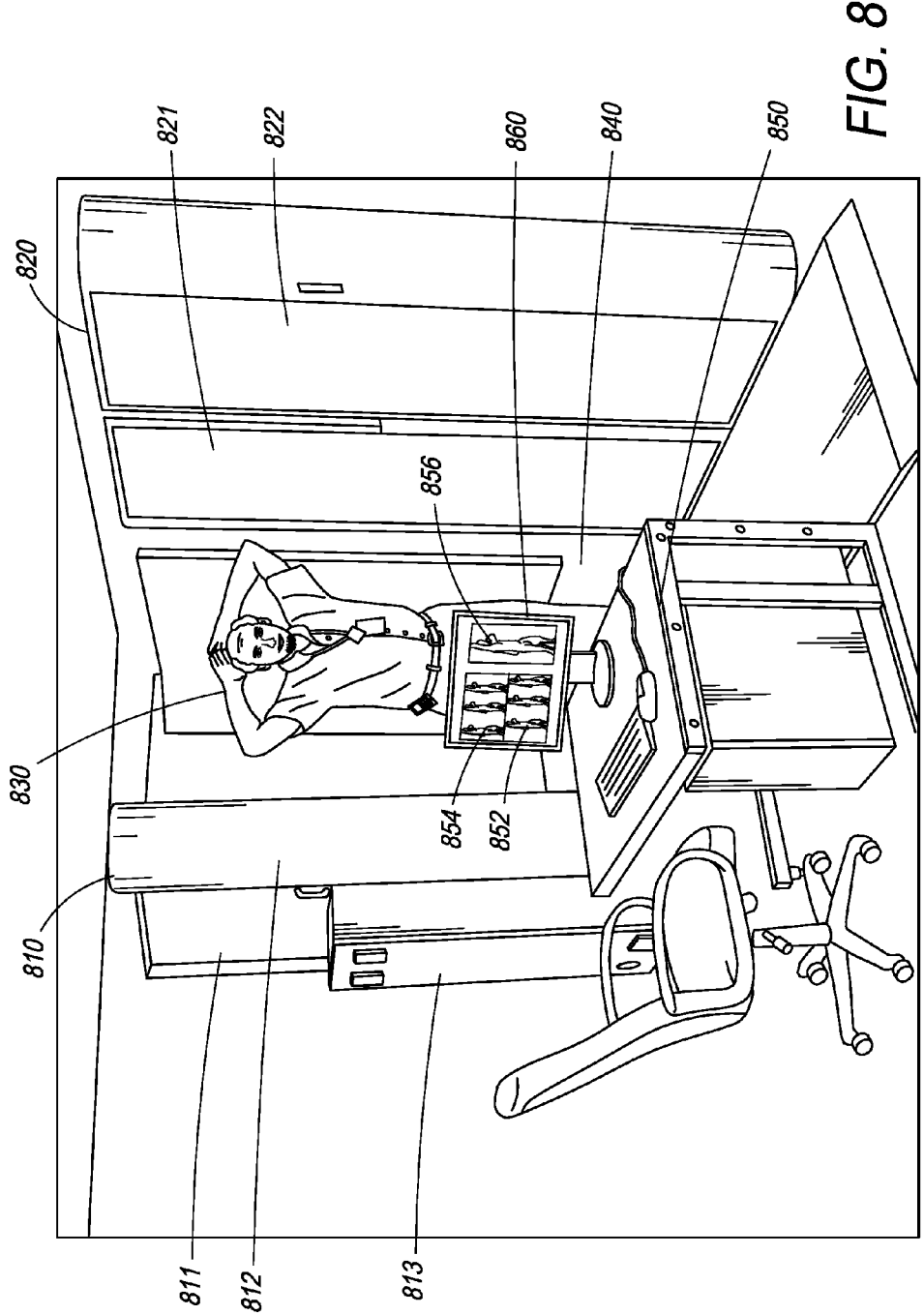
FIG. 8 illustrates another embodiment of the screening system of the present invention, in use.

In one embodiment of the present invention, and as shown in greater detail in FIG. 8, however, a single axis scanning beam through which a target will walk is employed. The walking motion of the target provides the second axis of motion. Thus, at any one given instant where the subject under inspection 103 or target moves through the vertically moving pencil X-ray beam 102, the precise location of the beam is known via the motor that controls the chopper wheel (described in greater detail below). At each instant, the detector arrangement 106 provides the measured response of back-scattered x-rays, the strength of which is represented in the resultant image. Because the system knows exactly where the pencil beam is located at every instant that the backscattered rays are detected, the image can be "stitched" together, to form the comprehensive image of the target.

Thus, in one embodiment, a fixed vertical scan beam constitutes one axis of motion and the intended subject provides the second axis of motion by walking or being conveyed through the vertical scanning beam. This configuration is advantageous because the single axis beam requires a very small rectangular opening at the detector panel. In current backscatter detection systems utilizing a dual axis scanning beam, the mechanical assembly requires a significant opening between the detectors to allow the scanning beam to exit. A significant opening is required because for a dual axis scanning beam system when the target is stationary (where a spinning chopper wheel provides one axis of motion and the vertical motion of this spinning chopper wheel provides the second axis of motion), the pencil beam of x-rays is projected in the horizontal direction. Thus, to cover a target the size of a person, the opening must be wider to allow the beam to cover entire person. In addition, a conventional large sized opening allows a large portion of backscatter radiation to escape undetected.

As described above, in one embodiment of the present invention, the second axis of motion is provided by the moving target. Thus, the beam can be oriented for vertical motion to allow for a smaller opening and optimum detector positioning. Referring back to FIG. 1, and as described above, the single axis scanning system of the present invention incorporates a small rectangular opening 172 between detector regions 110 and 120 for the X-rays to emanate therefrom. Further, the small opening 172 makes it possible to position additional and/or larger detector panels in the direct backscatter path, thereby enhancing image quality.

As described above, pencil beam 102 is rastered either horizontally or vertically across the subject, by employing a beam chopping mechanism by only allowing a minimal exit aperture for the x-ray beam to project. In one embodiment, the beam chopping mechanism is a chopper wheel having three slits positioned at 120 degrees apart and aligned with two parallel collimator slits such that each chopper slit will leave one of the parallel collimator slits while another is just entering the opposite parallel slit. This creates two parallel scanning beams that are interleaved in time and can be processed separately even with a single common detector array, circuitry and processing, all using a single source which conically illuminates the two parallel slits.

Figure 5A:
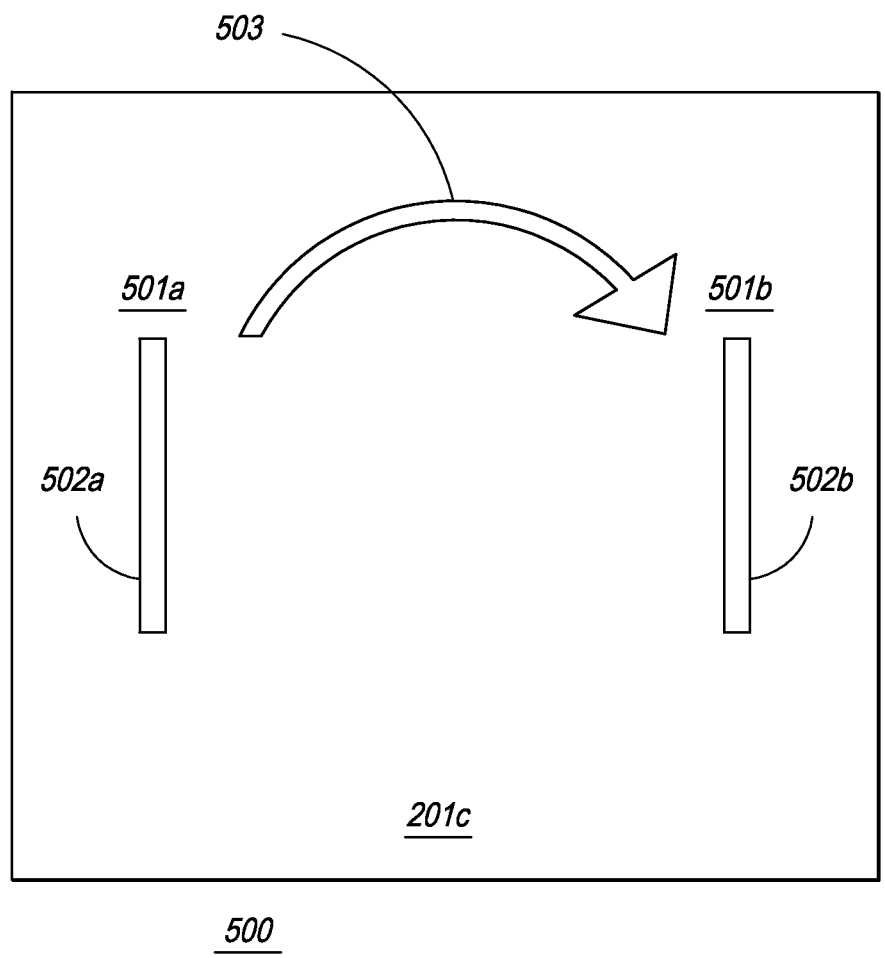
FIG. 5A illustrates a top view of an exemplary chopper wheel used in the screening system of the present invention.

FIG. 5A illustrates a top view of an exemplary chopper wheel 500 which can be used for obtaining a dual view (using two parallel, interleaved scanning beams) using a single source. The chopper wheel 500 has three slits, 501a, 501b and 501c, placed at an angular distance of 120 degrees from each other. There are also two parallel collimator slits 502a and 502b. Arrow 503 depicts the direction of motion of the chopper wheel, which in this embodiment is clockwise. This arrangement creates two "staggered" parallel scanning beams which, as mentioned earlier, are interleaved in time and can thus be processed separately using common detectors, circuitry and processing components.

Figure 5B:
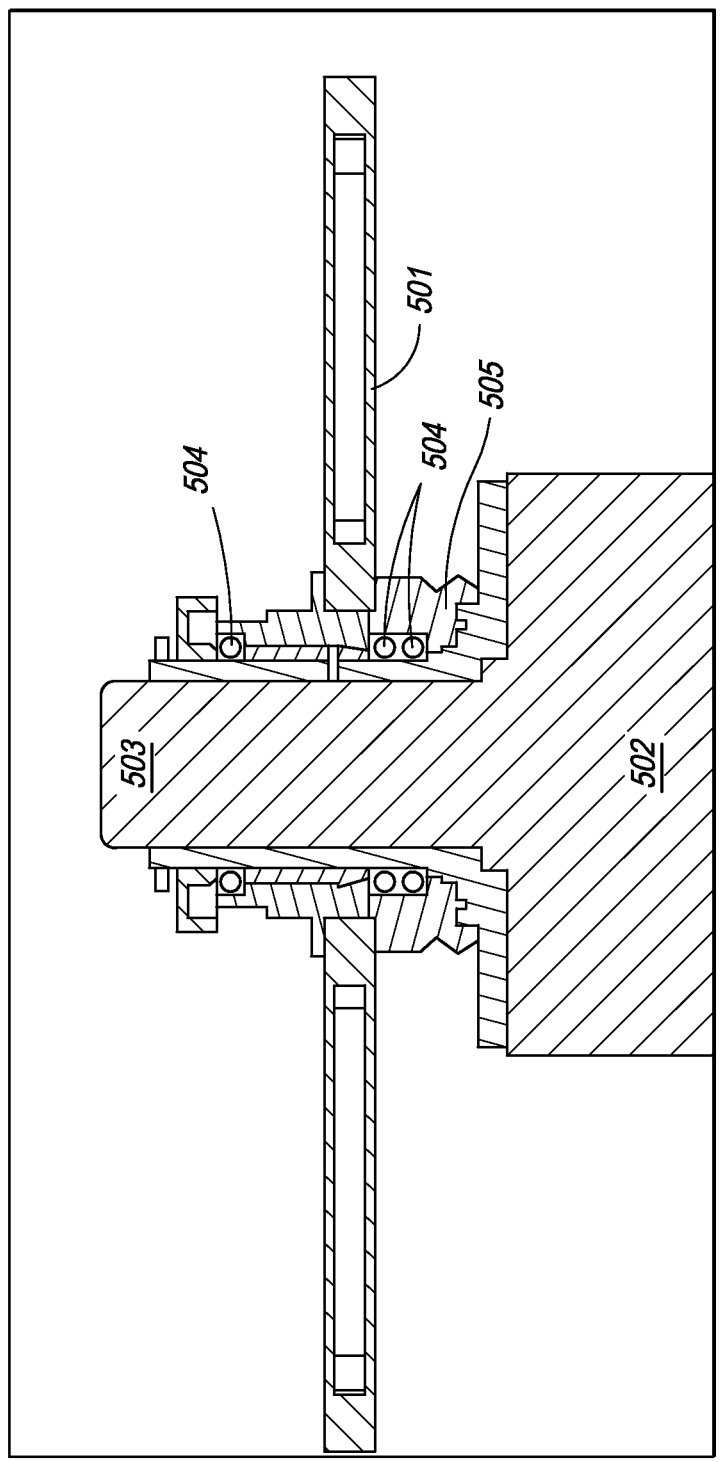
FIG. 5B illustrates an exemplary disk chopper assembly, with integrated electromagnetic motor and bearings.
Figure 5C:
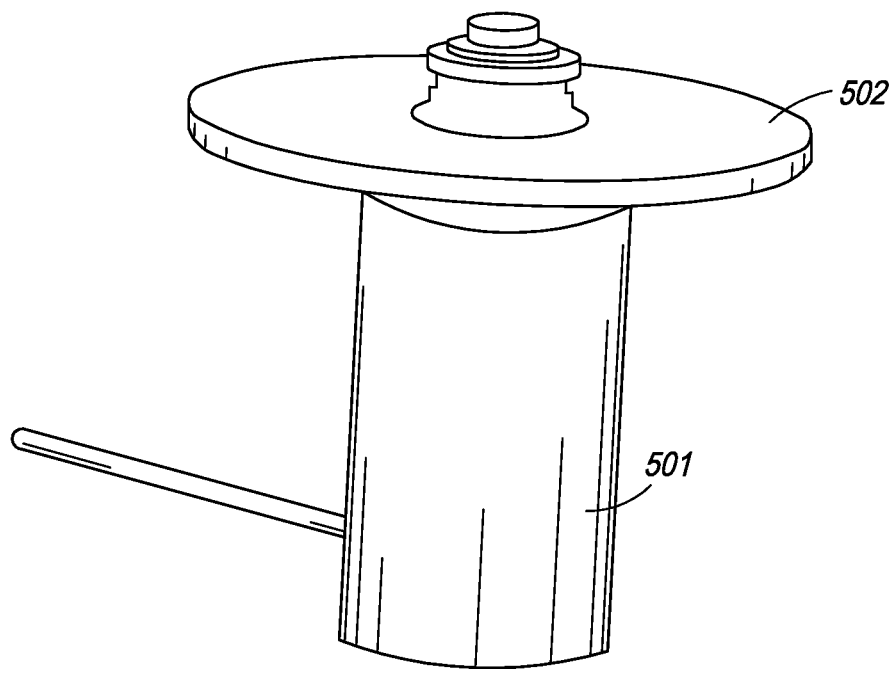
FIG. 5C illustrates an X-ray source coupled to a disk chopper, according to one embodiment of the present invention.

In one embodiment, the disk chopper assembly is dynamically controlled for rotation using an electromagnetic motor drive. FIG. 5B illustrates an exemplary disk chopper assembly, with integrated electromagnetic motor and bearings. Referring to FIG. 5B, the disk chopper 501 is coupled to the radiation source 502, which, in one embodiment, comprises an X-ray tube. The electromagnetic motor 503 is integrated with the X-ray tube 502 and the chopper 501. The motor assembly further comprises three compression bearings 504, and a V-groove 505 for belt drive backup. FIG. 5C illustrates the X-ray tube (source) 501 coupled to the disk chopper 502, minus the motor assembly.

In one embodiment, the X-ray inspection system further comprises a reference detector that compensates and monitors each emitted beam and further functions as a radiation monitor for monitoring emitted radiation within the inspection region. The reference detector is, in one embodiment, positioned within the beam path before the beam chopping apparatus, such as the beam chopper disk. The reference detector is may also be positioned after the beam chopping apparatus, such as the beam chopper disk, at the beginning of the formed scanned line. In such a case, the radiation detector may acceptably block the first 2 degrees of the beam.

Figure 6A:
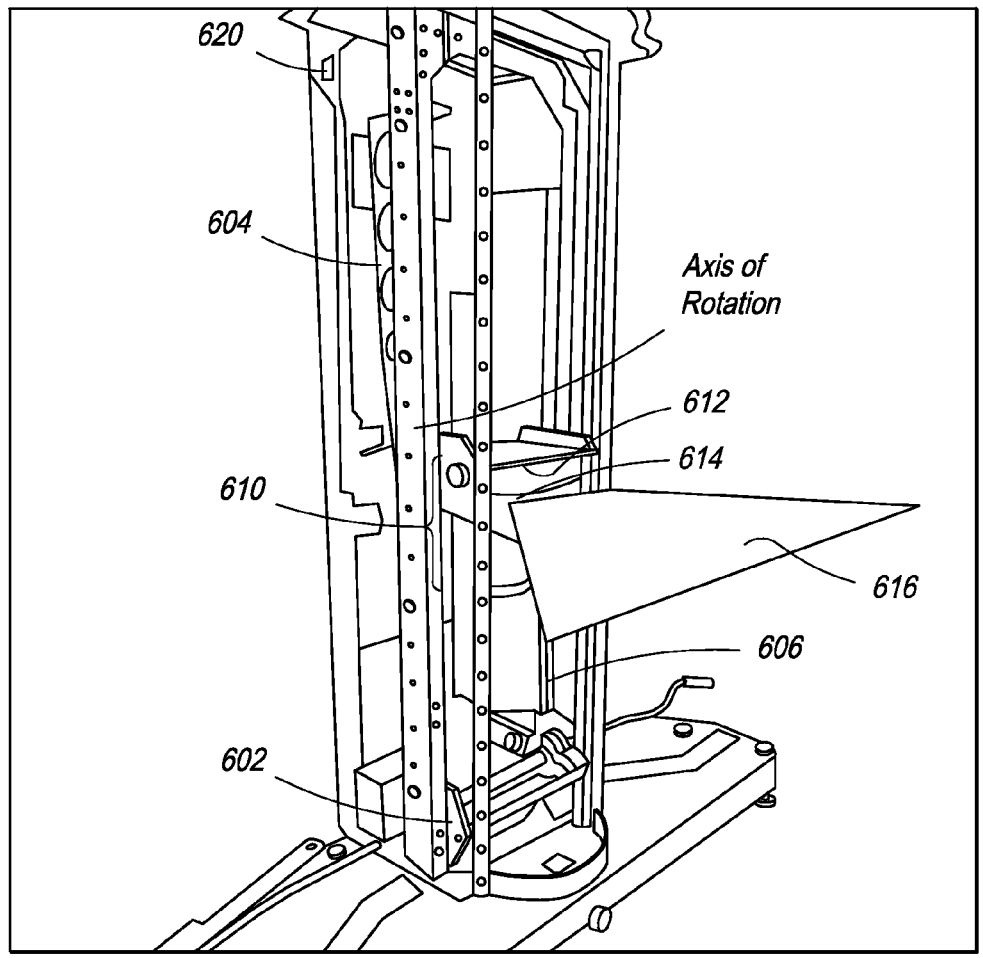
FIG. 6A illustrates an X-ray source being used in conjunction with a chopper wheel in an exemplary threat detection system, further showing a tilt "CAM" mechanism coupled to a source.

FIG. 6A illustrates an X-ray source being used in conjunction with a chopper wheel, as described in FIGS. 5A, 5B, and 5C, in an exemplary threat detection system. The source and chopper wheel are couple to a tilt "CAM" mechanism such that it enables substantially equal spacing between scan lines throughout the vertical motion of the x-ray beam. Referring to FIG. 6A, the module comprises a tilt CAM mechanism 602 coupled with an x-ray source assembly 610 all housed on frame 620. The tilt CAM mechanism 602 further comprises CAM guide 604. In addition, also housed on frame 620 is a motor for driving CAM mechanism and the belts used to lift the source. In one embodiment, a handle is attached to the source assembly 610 for enabling fitting in and removing the source assembly from the metal CAM guide frame 604. In various embodiments, all parts of the source assembly are securely attached by using predefined sizes of nuts, screws and clamps. In addition, lift belt 606 is provided to further enable lifting and counterbalancing of the source.

Figure 6B:
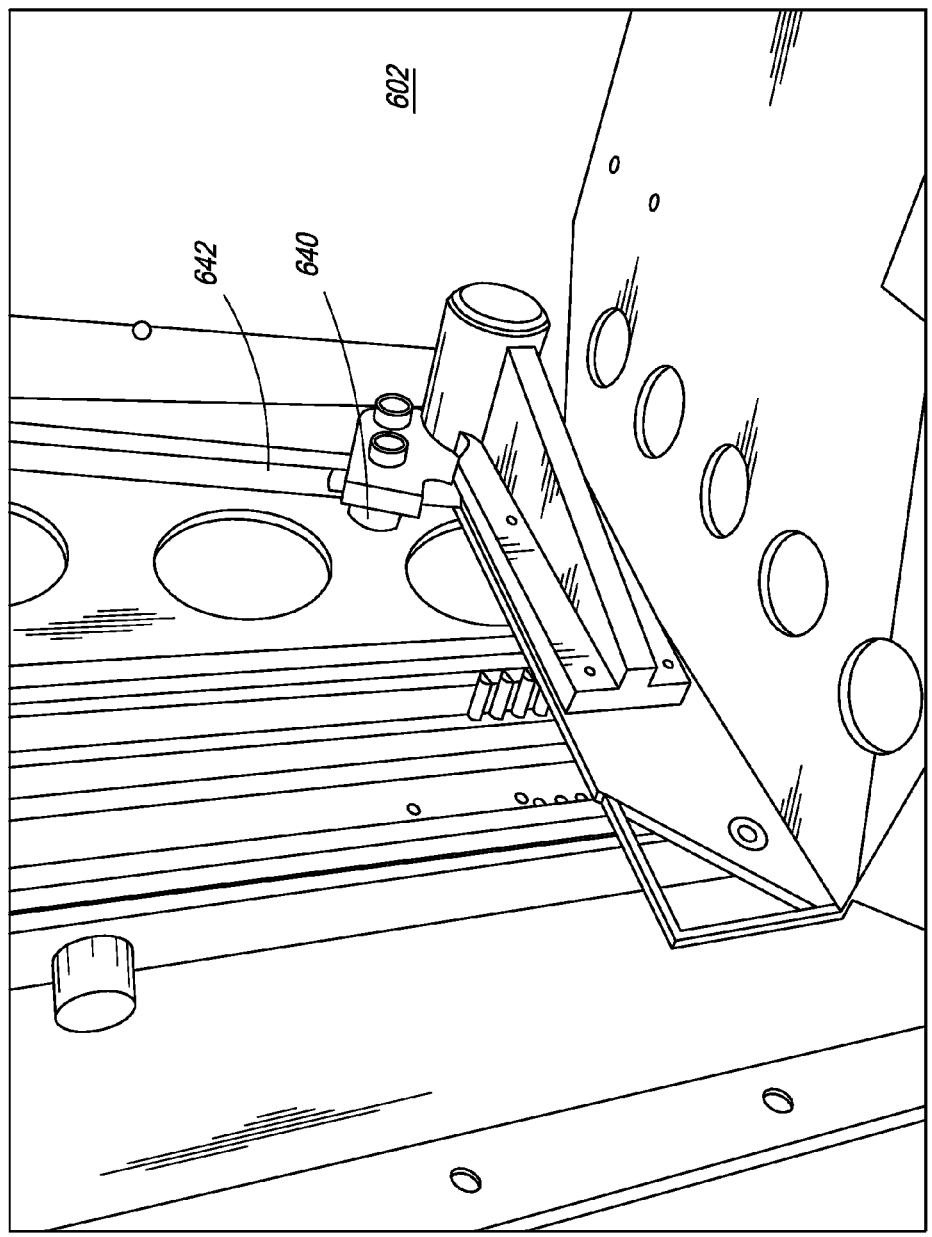
FIG. 6B shows a diagram of the metal frame title CAM mechanism 600 in an expanded view, further showing the drive wheel up against a CAM arm, such that it enables vertical motion of the source.

FIG. 6B shows a diagram of the tilt CAM mechanism 602 in an expanded view, further showing drive wheel 640 abutted up against CAM arm 642 such that it enables vertical motion of the source.

In another embodiment, a counterweight is employed to counterbalance the source and reduce stress on the lifting motor. In another embodiment, two lift belts may be employed to balance the source, eliminating the counterbalance and resulting in a much lighter source. In another embodiment, a gear reducer (15:1 reduction) and higher torque motor may be employed to eliminate the use of a counterbalance, as the source now seems 15 times lighter to the motor. However, the motor, in this case, would have to turn 15 times faster to achieve the same radiation pattern.

Figure 6C:
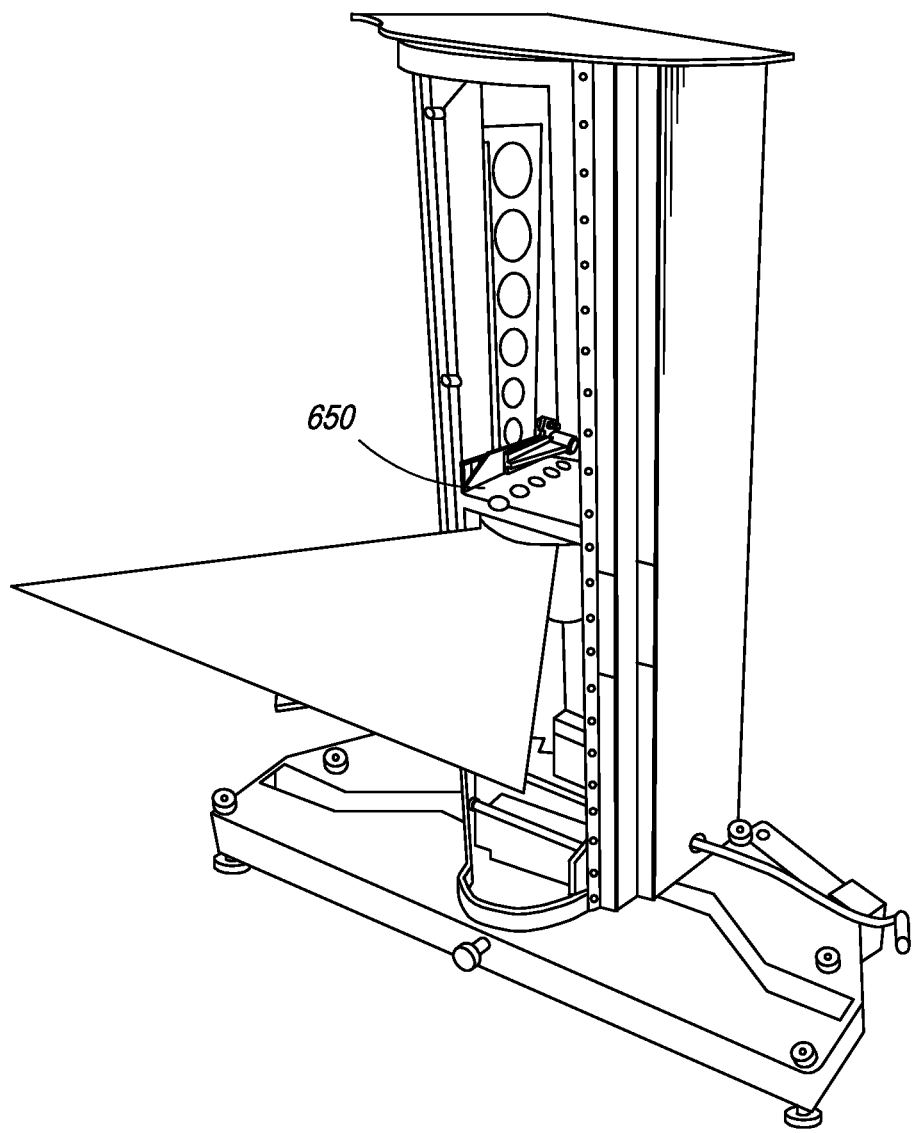
FIG. 6C illustrates another view of the module illustrated in FIG. 6A, further showing a rotating platform to rotate the source and corresponding power supply.

Referring back to FIG. 6A, the source assembly 610 comprises an X-ray source 612 and a disk wheel chopping mechanism 614 made of a suitable material such as metal or plastic for guiding the X-rays 616 generated by the X-ray source in a desired direction. In one embodiment, source assembly 610 also comprises a high voltage power supply enabling the operation of the source assembly. In an embodiment, the X-ray source 612, along with beam chopping mechanism 614, generates a narrow pencil beam of X-rays which are directed towards a subject under inspection through source rotation or beam traversal to create a scan line. In one embodiment, the disk wheel chopping mechanism 614 is optionally coupled with a cooling plate, which dissipates heat generated by the rotating chopper wheel. FIG. 6C illustrates another view of the module illustrated in FIG. 6A, further showing a rotating platform 650 to rotate the source and corresponding power supply.

It should be understood by persons having ordinary skill in the art that radiation sources are typically very heavy. In order to accommodate for the weight of the X-ray source, a chopper wheel configuration, as employed above, has to be rather large, and thus contributes to the overall weight of the system. Therefore, in another embodiment, the screening system of the present invention is equipped with a spin-roll chopper that is designed to present a helical profile aperture shutter for X-ray beam scanners and that is lightweight and easy to deploy. In addition, the use of the spin-roll chopper obviates the need for source rotation, rather the beam traverses from −45 to +45 degrees.

In one embodiment, the spin-roll chopper allows for variability in both velocity and beam spot size by modifying the physical characteristics or geometry of the beam chopper apparatus. In addition, the spin-roll chopper provides a vertically moving beam spot with constant size and velocity to allow for equal illumination of the target and creates a wider field of view during operation.

Figure 7A:
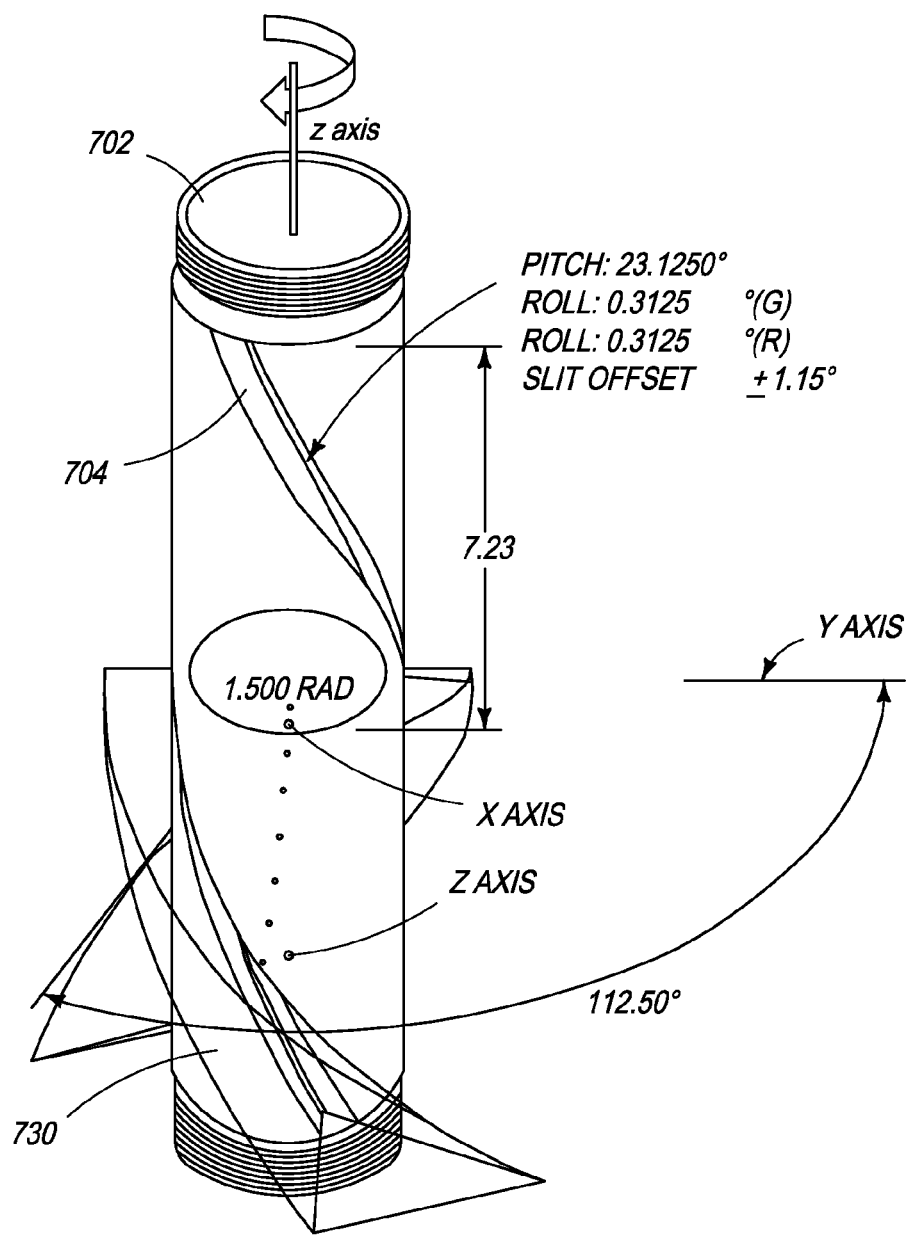
FIG. 7A is a mechanical illustration of an exemplary design of one embodiment of an exemplary beam forming apparatus.

FIG. 7A illustrates an exemplary design for one embodiment of the spin-roll chopper, as used in various embodiments of the present invention. Beam chopper 702 is, in one embodiment, fabricated in the form of a hollow cylinder having helical chopper slits 704. The cylindrical shape enables the beam chopper 702 to rotate about the Z-axis and along with the helical apertures 704, create a spin-roll motion.

Thus, an X-ray beam scanner employing the spin-roll chopper of the present invention effectuates beam chopping by rotating the hollow cylinder 702 machined with at least two helical slits 704, which enables X-ray beam scanning with both constant and variable linear scan beam velocity and scan beam spot size. The spin-roll chopper enables both constant and variable linear scan beam velocity by manipulating the geometry of the helical apertures. In one embodiment, the velocity is varied or kept constant by manipulating the pitch and roll of the helical apertures along the length of the spin-roll chopper. Thus, it is possible to have a constant speed or to slow the scan down towards areas where more resolution is desired.

The spin-roll chopper also enables variable and constant beam spot size by manipulating the geometry of the helical apertures, thus varying the resultant beam power. In one embodiment, it is possible to manipulate the actual width of the aperture to alter the beam spot size. In one embodiment, the width of the helical aperture varies along the length of the spin-roll chopper cylinder to compensate for the varying distance of the aperture from the center of the source and allow for uniform beam spot projection along the scan line. Thus, in one embodiment, the farther the aperture is away from the source, the narrower the width of the helical aperture to create a smaller beam spot size. In one embodiment, the closer the aperture is to the source, the wider the helical aperture to create a larger beam spot size.

When employed in a body scanning system, it is possible to vary the pitch and roll and width of the helical apertures such that more beam scanning power is directed towards areas of the body (hair, feet, etc) that require more detail and resolution and less power is directed towards areas of the body (midsection, etc.) that are more sensitive to radiation.

Helical slits 704 also ensure that the projection of the X-ray beam is not limited by the dual collimation of the two slits. As described in greater detail below, dual collimation refers to the concept whereby the X-ray beam will pass through two helical slits at any given point in time. The resultant X-ray beam trajectory 730 is also shown in FIG. 7A and described in greater detail with respect to FIG. 7C below.

In an embodiment of the present invention a plurality of viewing angles ranging from sixty degrees to ninety degrees can be obtained through the helical slits in the spin-roll chopper. In one embodiment, the scan angle is a function of the distance between the spin-roll chopper and both the source and the target. In addition, the overall height and diameter of the spin-roll chopper affects the viewing angle. The closer the spin-roll is placed to the source, the smaller the spin-roll chopper will need to be and similarly, the farther the spin-roll chopper is placed from the source, the larger the spin-roll chopper would need to be.

Figure 7B:
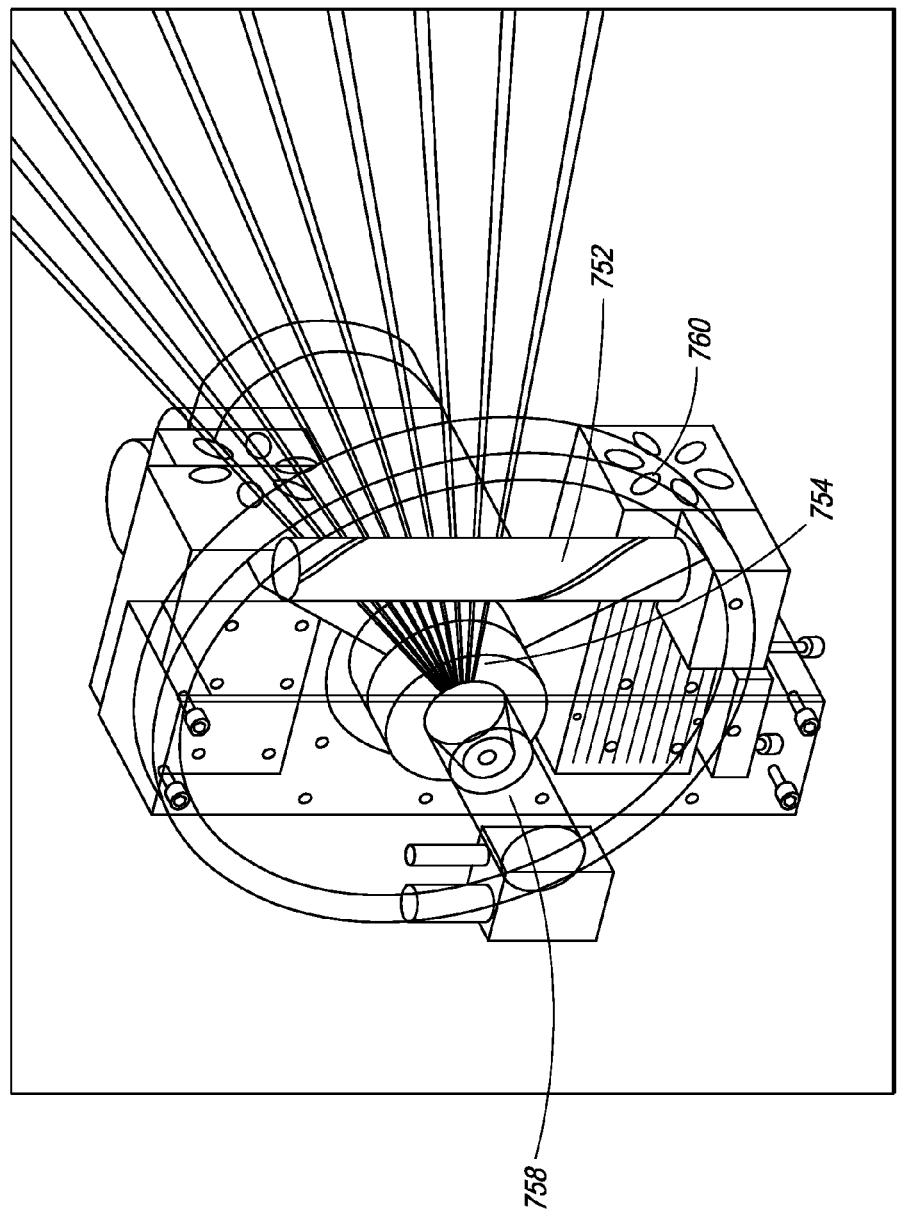
FIG. 7B illustrates an exemplary beam forming apparatus with an X-ray source.

FIG. 7B illustrates a beam chopping mechanism using the spin-roll chopper described with respect to FIG. 7A. Referring to FIG. 7B, the cylindrical spin-roll chopper 752 is placed in front of a radiation source 754, which, in one embodiment, comprises an X-ray tube. In one embodiment, rotation of the chopper 752 is facilitated by including a suitable motor 758, such as an electromagnetic motor. In another embodiment, as described in greater detail below, magnetic bearings are employed to facilitate rotational movement of the spin-roll chopper of the present invention. The speed or RPM of rotation of the spin-roll chopper system is dynamically controlled to optimize the scan velocity. In one embodiment, the spin-roll chopper system is capable of achieving speeds up to 80K RPM.

In one embodiment, a radiation shield is provided on radiation source 754 such that only a fan beam of radiation is produced from the source. The fan beam of radiation emits X-rays and then passes through the spin-roll chopper, which acts as an active shutter. Thus, there is only a small opening when the spin-roll chopper, and therefore helical apertures are rotating, which provides the moving flying spot beam.

FIG. 7B also shows a disk chopper wheel 760 superimposed upon the source along with the spin-roll chopper. It can be seen from FIG. 7B that chopper wheel 760 is substantially larger than spin-roll chopper 752.

Figure 7C:
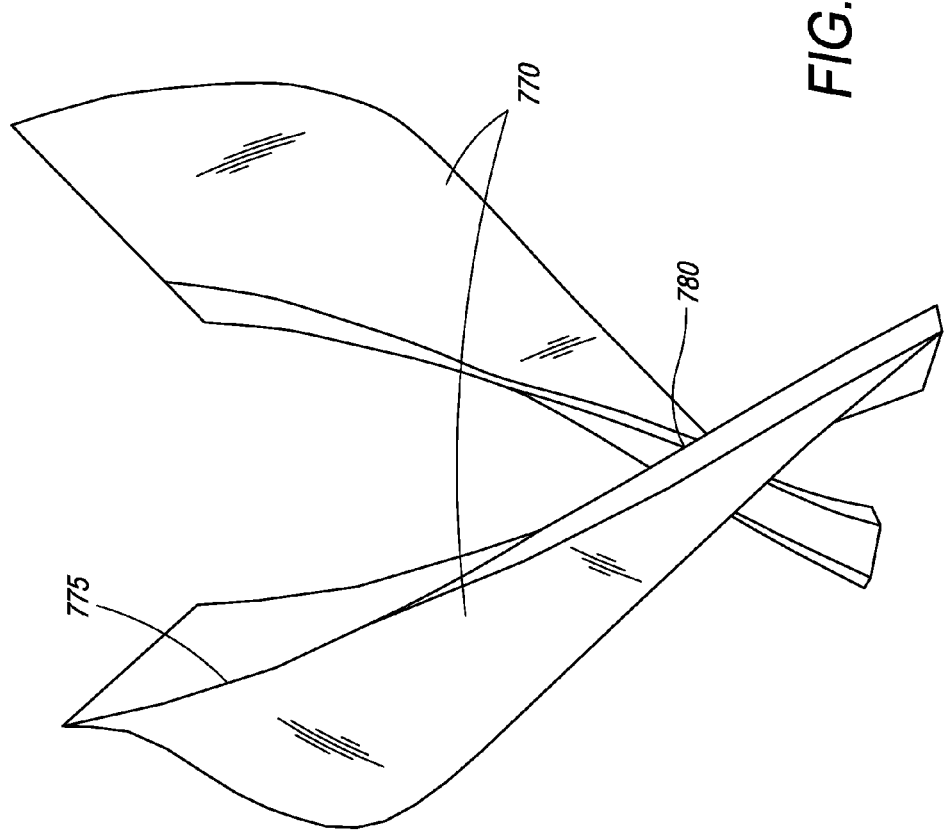
FIG. 7C is a mathematical expression of the trajectory of the beam using the spin-roll chopper of the present invention with a single source, in accordance with one embodiment.

In accordance with an embodiment of the present invention, at certain distances from the center of the beam, the helical slit (of the spin roll chopper) is kept wider than others. FIG. 7C shows a mathematical expression of the trajectory 770 of the beam using a single source, in accordance with one embodiment. In order to get the dimensions of the helical cuts in the spin-roll cylinder, one dimension of this trajectory was removed. More specifically, the slit is narrower at the top 775 because there is a greater distance for the beam to travel. Note that when an X-ray beam travels through any opening, the beam is collimated. The farther the beam travels, the wider the resultant "spot" (fan beam) is at the end of the beam. By making the slit narrower at the top 775, this greater distance and beam widening is accounted for. In addition, the slit is made wider where the distance to the object is shorter, such as at point 780. Also, persons of ordinary skill in the art should appreciate that by controlling the size of the slit one can control the density of the beam that is projected straight through.

U.S. Provisional Patent Application No. 61/313,772 entitled "Walk-Through People Screening System" and filed on Mar. 14, 2010, and its corresponding children applications are incorporated herein by reference in their entirety.

The system of the present invention is designed such that the distance of the beam chopping mechanism from the target is directly correlated with a minimum scan height. This allows for longer distance from source to the target, thereby extending the depth of field with respect to dose rate to the target. Therefore, for a given depth of imaging, a smaller radiation dose is required with the system of the present invention as compared to other systems known in the art.

An exemplary practical application of the screening system of the present invention is illustrated in FIG. 8. Referring to FIG. 8, first scanning side 810 and second scanning side 820 are used to create an inspection area through which the individual to be scanned walks. The first scanning side 810 comprises two detector panel towers 811 and 812. In one embodiment, X-ray enclosure 813 is also located proximate to first scanning side 810. Second scanning side 820 is positioned across the walkway from first scanning side 810, thus forming inspection area or volume 840. Second scanning side 820 comprises two detector panel towers 821 and 822. A second X-ray enclosure is located proximate to the second scanning side 820. As subject 830 walks through the system both first scanning side 810 and second scanning side 820 scan the subject to obtain an image of both a front left and a back right view of the person. In one embodiment, first scanning side 810 and second scanning side 820 scan the subject sequentially, with a minimal time delay between scans. Therefore, subject 830 does not need to turn or stop for scanning; a complete image is produced simply as the person walks through the inspection area 840. In one embodiment, a person being scanned is conveyed or moved, such as by a moving walkway, through the detection area. The generated image can be reviewed at the operator station 850. Since scanning sides comprising a source and detector array are used for imaging, the image produced by each scanning side can also be viewed individually. Thus, referring back to FIG. 8, the operator's screen 860 also separately presents front and rear views 852 and 854, respectively, in addition to overall picture 856. Further, in this kind of walk-through arrangement, several persons can be rapidly screened by simply asking them to walk through the inspection area in a queue. In the exemplary application, the operator's screen 860 also shows queued front and rear images, 852 and 854, from three persons.

It should be appreciated that the inspection system is capable of imaging both metal and non-metal objects (including explosives and non-metal weapons) on a person (including within or under clothing) without the removal of clothing and is capable of processing generated images to only show a body outline and highlight threatening or illegal objects, including both organic and inorganic materials, while hiding private body features, thereby creating a privacy image. The inspection system is configurable such that only the privacy image will be available to the operator. Alternatively, the system may be configurable such that the privacy image is the default image but the raw image, generated prior to processing to only show a body outline and threatening or illegal objects, is still available to the operator.

Additionally, the system a) comprises an internal safety monitoring circuit to continually monitor safety of system and radiation levels during each scan, b) provides an ionizing radiation dose no greater than 5 micro-rem per scan to any person under inspection, c) scans one side of person in 8 seconds or less, d) shall have a length no greater than 125 cm (length dimension faces person under scan), e) shall have width no greater than 100 cm, f) shall have height no greater than 205 cm, g) shall have an optional wall to aid in privacy of the subject being screened and prevent interference from the background, which will enhance the detection capabilities of the system by making inorganic objects on the side edge of the body more visible in the image and permit full coverage of the body in 2 scans as opposed to 4 scans when the wall is not used, h) shall have an optional communications monitor to facilitate communications between a remote inspector and a local operator and to communicate an image outline of the real body instead of the stick man or a simplified, i.e. "stick man", image with search locations highlighted therein where the image is "calibrated" to adjust for varying body heights of persons relative to the body height of the stick man, i) shall be able to scan a six foot person standing 10 inches away, measured from the detector wall to the person's nose, j) shall be capable of communicating to a workstation deployed remote from the scanning system, k) shall be possible to initiate a scan from the remote workstation, l) can be configured to a predefined number of scans per person which shall complete before incrementing to the next person, m) shall permit extra scans to be taken, as an option available to an operator, before incrementing to the next person, n) shall be configurable to force an operator to pass or clear each scan independently, even if multiple scans are required of the same person, o) shall communicate scan results (pass or fail) to a remote operator via visual light indications, which can be remotely viewed by the remote operator, on the local system, i.e. a red light for "fail" and a green light for "pass", p) shall be able to report what operator was logged into the system during which time period and how many persons were scanned by the operator during such period, how many total persons were scanned during each hour of the day, and the number of scans and number of persons scanned in any predefined time period (such as hour, day, or month), q) shall have the option of a training simulator with an image library of at least 100 training images. U.S. Pat. No. 7,110,493 is hereby incorporated by reference.

Image processing software of the detection system of present invention makes use of appropriate algorithms to reconstruct images such as combining separate front and rear images to create a complete image, as well as for image analysis to determine threats. In one embodiment, a segmentation algorithm is used to distinguish threat objects. An example of use of the segmentation algorithm is illustrated in FIGS. 9a through 9c. Referring to FIG. 9a, image 901 shows a person free of threats carried on the body (benign subject). In FIG. 9b, image 902 shows a person carrying a backpack 903. In order to determine whether the backpack poses a threat, the software uses segmentation algorithm to segment out the backpack 903 from the image 902, and generate a separate image 904 as shown in FIG. 9c. The object size and the pixel intensity of the segmented object are then used to identify threats.

Figure 10B:
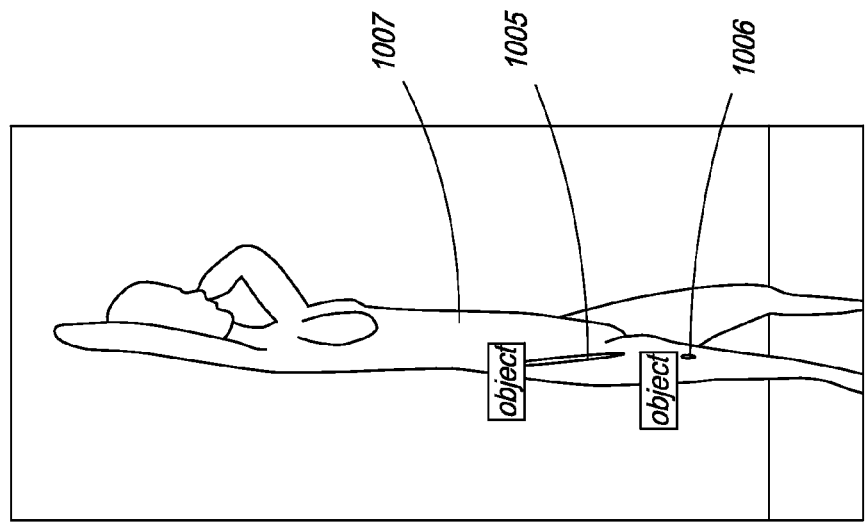
FIG. 10B is an image obtained from using a segmentation algorithm in accordance with one embodiment of the present invention.
Figure 10A:
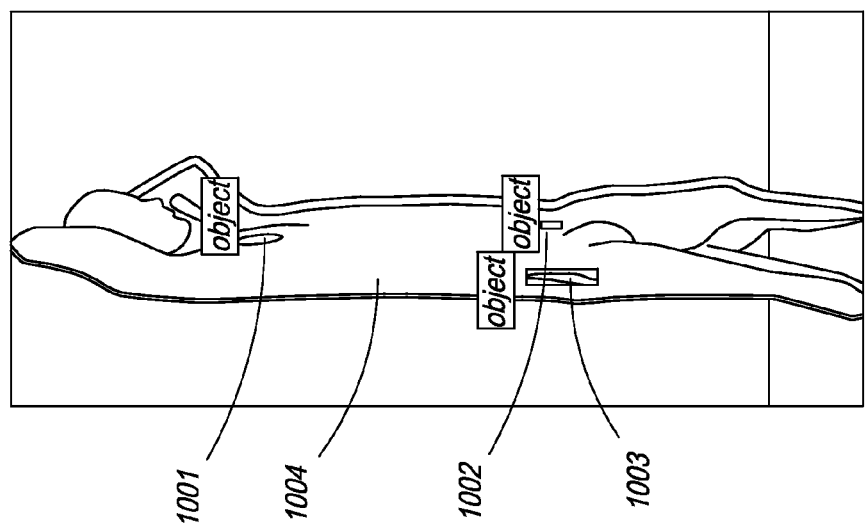
FIG. 10A is an image obtained from using a segmentation algorithm in accordance with one embodiment of the present invention.

The segmentation algorithm is also used to distinguish dark objects on a white background. This feature helps to accurately identify threats comprising absorbing materials, such as metal knives and guns, and ceramic knives. An example of use of this feature of the segmentation algorithm is illustrated in FIGS. 10a and 10b. Referring to FIG. 10a, three potential threat objects 1001, 1002 and 1003 are detected on the individual 1004 being screened. In FIG. 10b, two threat objects 1005, 1006 are detected on the individual 1007 being screened. In both FIGS. 10a and 10b, the same algorithm is used for imaging, with the same parameter settings. From these images, it would be apparent to a person skilled in the art that the image analysis algorithm used by the detection system of the present invention is significantly insensitive to the level of the background. This is because the background is computed from the original image itself, and any potential threats are highlighted. As should be evident to one of ordinary skill in the art, as shown in FIGS. 10a and 10b, the individual's body fills only a partial area of the image. The balance of the image is considered background X-ray scattered signal. Computational methods as simple as averaging or localized smoothing (averaging over localized areas) provide an accurate measure of the background signal level.

Further, the image analysis algorithm of the present invention also facilitates rapid screening, as it typically takes less than one second to generate an image.

U.S. patent application Ser. No. 12/887,510, entitled "Security System for Screening People" and U.S. Pat. No. 7,826,589, of the same title, both assigned to the applicant of the present invention, are herein incorporated by reference in their entirety.

U.S. patent application Ser. No. 12/849,987, entitled "Personnel Screening System with Enhanced Privacy" and U.S. Pat. No. 7,796,733, of the same title, both assigned to the applicant of the present invention, are herein incorporated by reference in their entirety.

Figure 11:
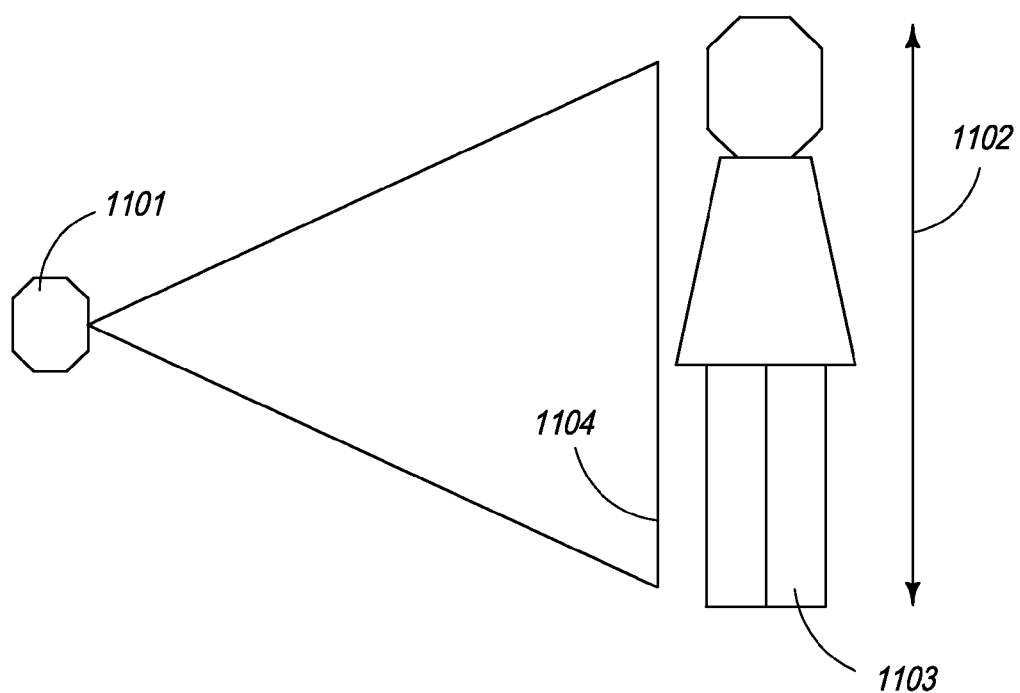
FIG. 11 is a side view diagram illustrating vertical scanning using a single radiation source.

As mentioned earlier, with respect to FIG. 1, the design of the present invention allows for more detector panels to exist in the direct backscatter path, thereby contributing to image quality. The image quality is increased further in another embodiment, by using an approach that increases the area of the detection field and the number of detectors that can be employed. This novel approach is described with reference to FIGS. 11 and 12. FIG. 11 illustrates a side view showing vertical scanning with a single source 1101. In this configuration, the height 1102 of a subject 1103 that can be scanned using the single source 1101 is limited by the view width 1104 or the illumination span of the source.

Figure 12:
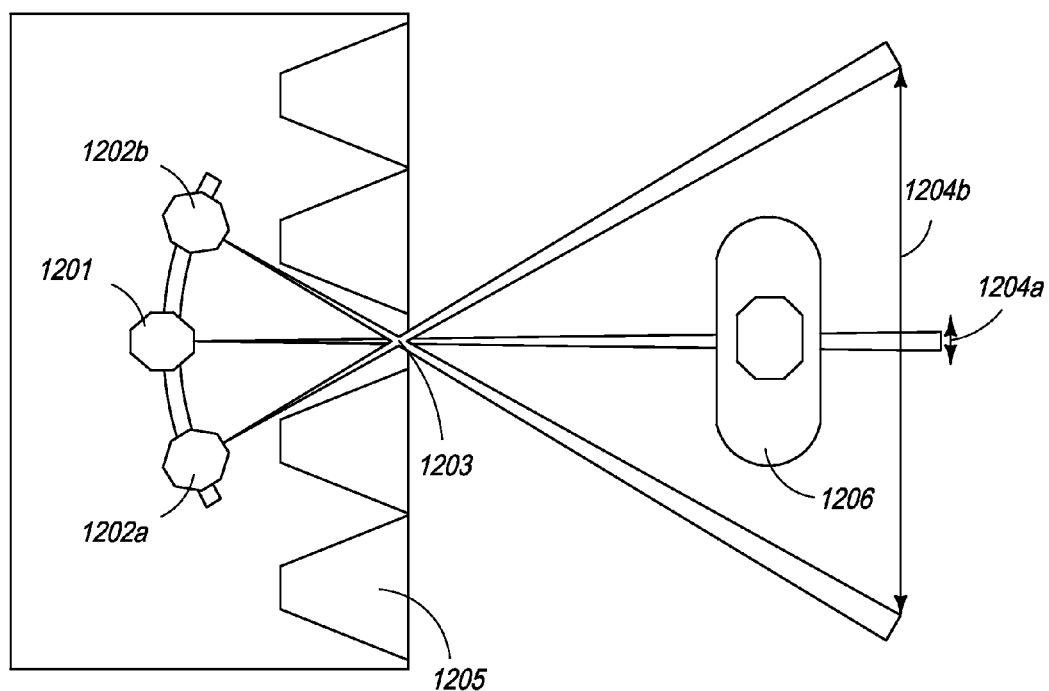
FIG. 12 shows the top view of an exemplary screening arrangement used in the present invention.

To overcome this limitation, the present invention, in one embodiment, employs a novel configuration illustrated in FIG. 12, which shows a top view of an exemplary scanning arrangement. Referring to FIG. 12, the single axis scanning source assembly 1201 is pivoted from point 1202a to 1202b, with a center of rotation 1203 at the front panel of the system. As can be seen from FIG. 12, 1204a is the view width available for the subject 1206, when the source 1201 is fixed, whereas 1204b is the view width available when the source is pivoting. Thus, the view width for a given source expands when it is pivoted. In this case, a larger number of detectors 1205 can be added to the system, thereby providing for an increased detection area. Further, a fixed rectangular opening is provided at the front panel, which also serves as an aperture keeping the focal spot very small in at least one axis. Further, with an optionally pivoting source as shown in FIG. 12, the same system can be employed to perform scans of targets when the person is in motion (and the source is not pivoting) or when the person is stationary (and the source is pivoting). With a stationary target, the image quality is nominally better than when a target is in motion because distortions are caused by differential velocity in the part of the moving subject (e.g., legs and arms). Thus under certain operational situations, the same system could perform a more detailed scan (with the target stationary) if an anomalous object is found on the first scan (when the target is in motion). The choice of system depends upon scanning requirements and is a trade-off between threat detection and high through-put.

As described above, in one embodiment, the detection system of the present invention is implemented as a walk-through detection system. The novel design of the system enables utilization of low-level radiation doses for detection of weapons and dangerous materials, regardless of whether they consist of metal, high-Z or low-Z materials. The radiation dose is in range of less than 20 microrem, preferably less than 10 microrem, more preferably less than 5 microrem and even more preferably less than 1 microrem. This portal configuration can accommodate a high throughput of people as compared to conventional systems because each person being screened simply walks through the portal. Further, the person being screened does not need to stop and turn his or her body as directed by a scanner system operator. In addition, in using such a portal configuration through which the target walks, with its relatively confined area, is easier to combine with other walk-through devices, including metal detectors, drug and explosives sniffers, and video cameras.

Besides being employed for screening of passengers at airports and railway stations, at open and crowded venues such as stadiums and shopping malls, applications of the system of present invention may be extended to inspecting the contents of vehicles and containers at transit points such as ports, border crossings and customs checkpoints etc. In one embodiment, the detection system is implemented as a 'drive-through' system, through which a cargo vehicle to be scanned can be driven, thereby providing a second axis of motion. The detection system of the present invention may also be used for medical purposes.

Figure 13:
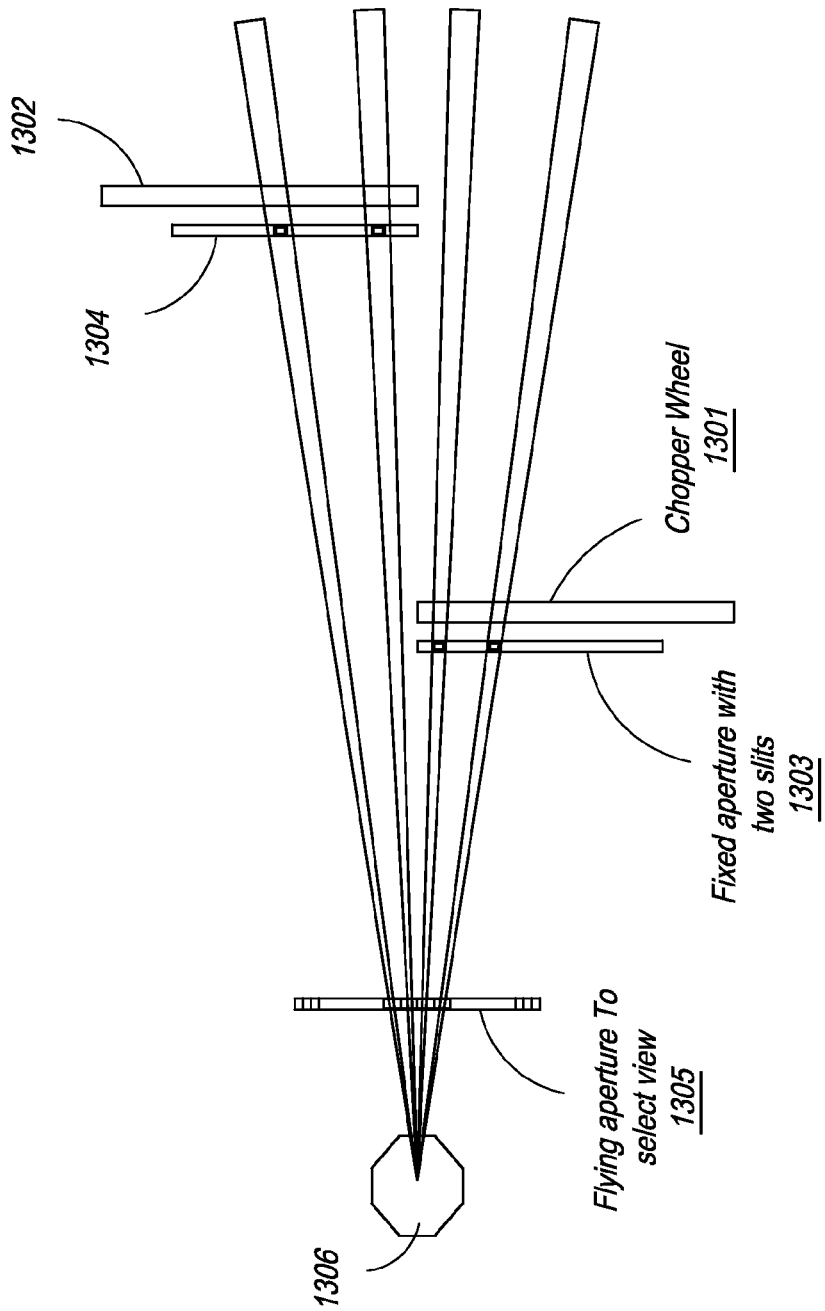
FIG. 13 illustrates an exemplary source arrangement, having dual wheels and a flying aperture for range selection.

In cases where there is a short distance between the target and the source, a large scan angle is required for close-up scans. This requirement of a large scan angle competes with chopper wheel size and spatial resolution. In order to attain a balance between conflicting requirements, the system of present invention, in one embodiment, employs a dual wheel approach using a flying aperture for range selection. This is illustrated in a top-down view of the scanning system in FIG. 13. Referring to FIG. 13, the illustrated embodiment uses two chopper wheels 1301 and 1302. The chopper wheels 1301 and 1302 have slits 1303 and 1304, respectively, which provide a fixed aperture for the radiation beam. A flying aperture 1305 is also provided close to the source 1306 which is used to select view or range of scan just prior to the subject entering the scan area. In one embodiment, the range selection is aided by use of sensor and/or camera. The range selection feature of the present invention allows several optical geometries to be used for various target ranges.

Figure 14:
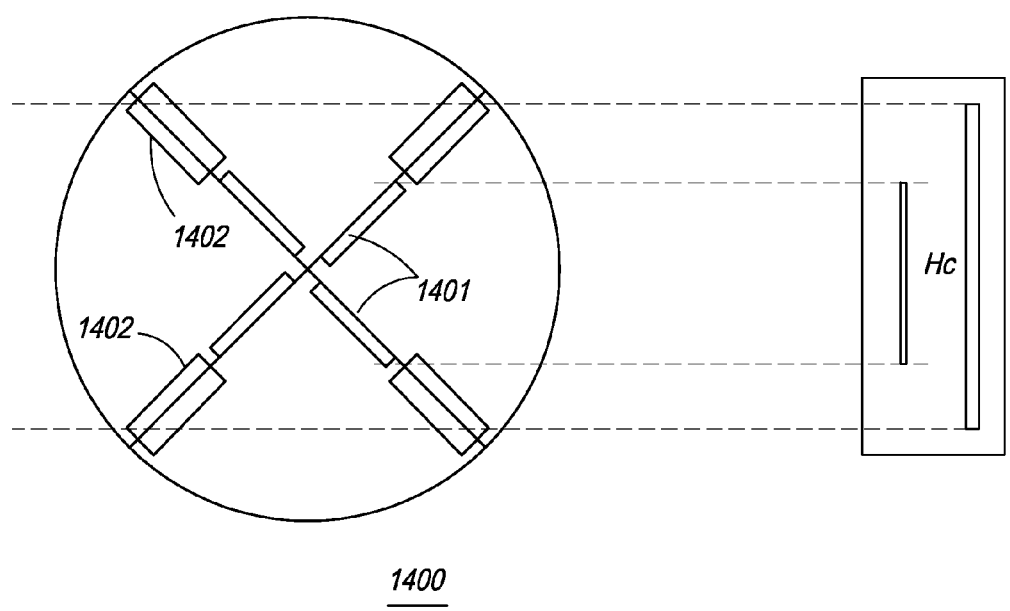
FIG. 14 illustrates an exemplary chopper wheel that can be used in the dual wheel system described with respect to FIG. 13.

In one embodiment, each chopper wheel used in the dual wheel arrangement described above has inner and outer slits with different slit sizes, scan angles and filtration. FIG. 14 illustrates an exemplary chopper wheel 1400 that can be used in the dual wheel system. Referring to FIG. 14, the wheel 1400 has inner slits 1401 and outer slits 1402 which can be used to obtain a fixed aperture with two views and two different scan angles.

Figure 15:
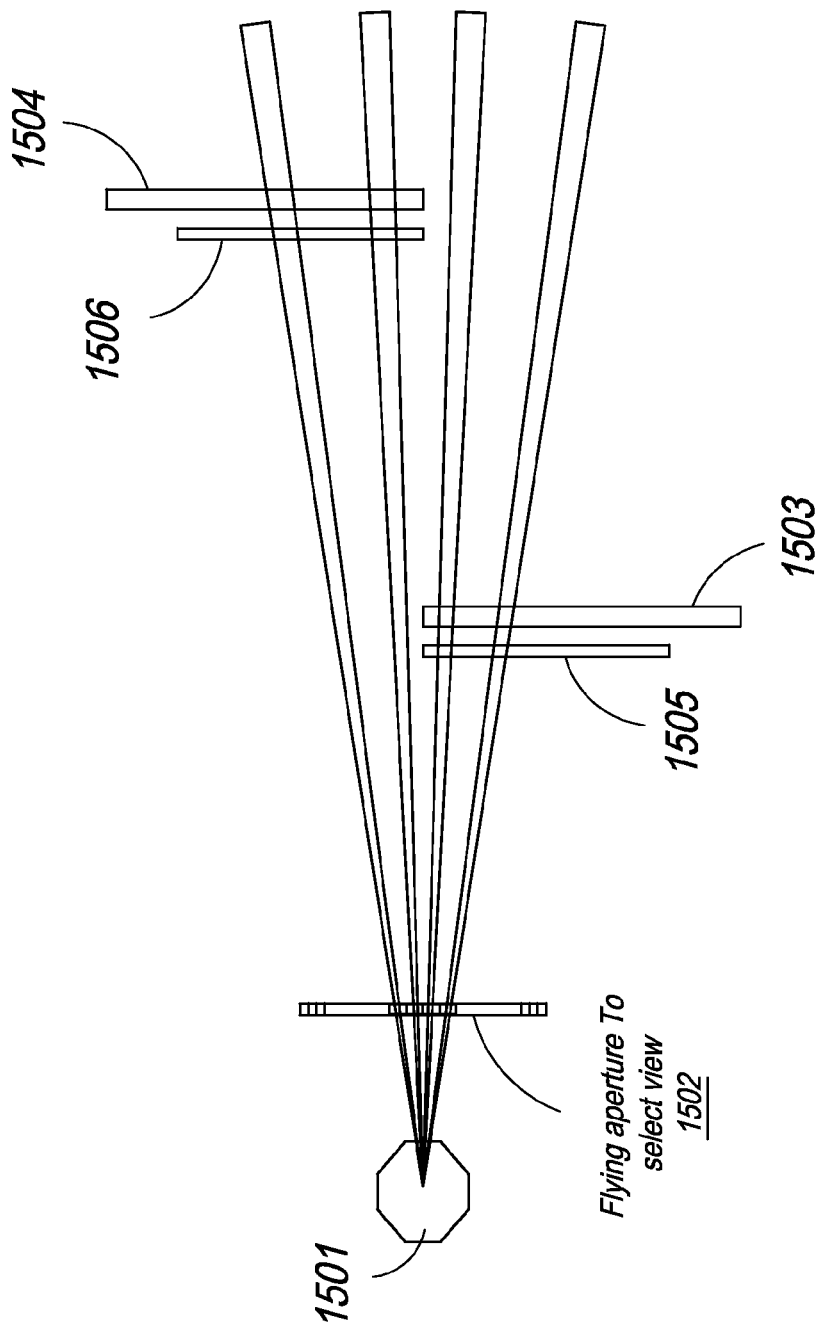
FIG. 15 is another top view of the vertical scanning system described with respect to FIG. 11, further illustrating a flying aperture in accordance with one embodiment of the present invention.

FIG. 15 illustrates another top down view of the vertical scanning system with flying aperture 1502 placed next to the source 1501. The system has a near view chopper 1503 with slits 1505 and a far view chopper 1504 with slits 1506. The outer slits of the near view chopper 1503 are used for closest view, largest scan angle, highest filtration and its inner slits are used for near-mid view with medium scan angle and filtration. The outer slits of the far view chopper 1504 are used for far-mid view, small scan angle, low filtration and its inner slits are used for farthest range with smallest scan angle and no filtration. The use of two chopper wheels for scan angle and range selection also offers the opportunity to adjust dose levels based on target distances.

Figure 16:
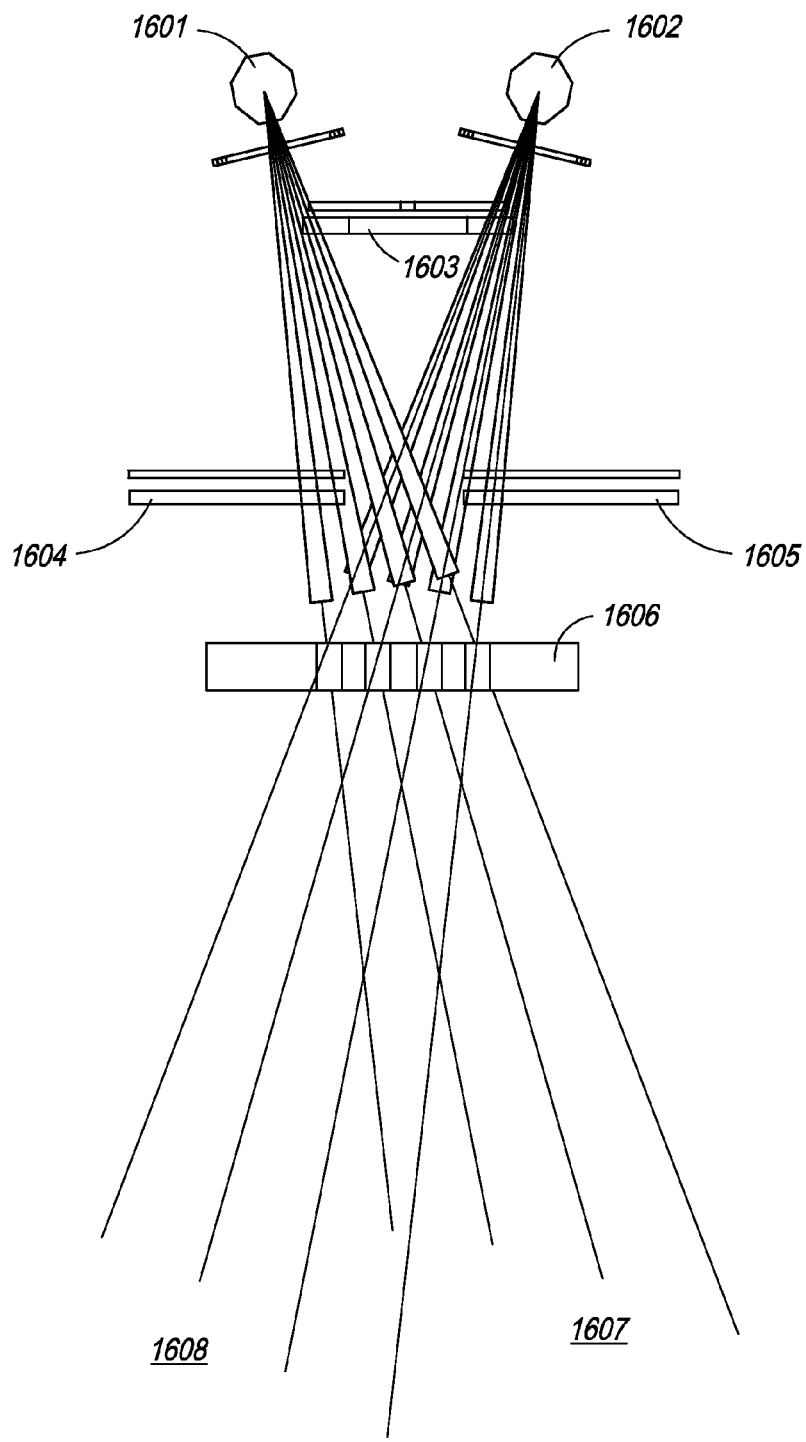
FIG. 16 illustrates an exemplary arrangement for a dual-view, quad-range system, according to one embodiment of the present invention.

In another embodiment, the system is implemented as a dual source, two-sided 4-view backscatter walk-through system, which also works on the principle of employing a single axis-scanning beam with the motion of object/subjects through the beam providing the second axis. FIG. 16 illustrates an exemplary arrangement for the dual view, quad-range system. Referring to FIG. 16, two sources 1601 and 1602 are used. Two choppers are used with each source for near and far views, in an arrangement similar to that discussed above with reference to FIGS. 13 and 15. In the arrangement of FIG. 16 however, the near chopper 1603 is shared between the two sources. Two far choppers 1604 and 1605 are used for sources 1601 and 1602 respectively. In one embodiment, all the chopper wheels 1603, 1604 and 1605 have three slits each. Further, the chopper wheels 1604 and 1605 are synchronized in geometry as well as movement. A "Vertical Scan Aperture" or VSA 1606 is provided in the scanning system, which is connected between detector panels thereby offering better spatial resolution in one axis. In one embodiment, the VSA 1606 comprises multiple slits and helps maintain high resolution in the X-axis.

In this embodiment, a single VSA 1606 is used for the beams 1607 and 1608 emanating from both the sources 1601 and 1602, respectively. The dual source arrangement described above provides near views or ranges at larger angles. This keeps far targets closer to the center of the detector and hence provides better imaging for quad-range views.

In one embodiment, the detection system of the present invention utilizes the concept of 'vector imaging' for obtaining additional information in images. In current imaging methods, the signals from detectors are all electrically summed together. However, in the vector imaging method of the present invention, the signals generated on multiple detector panels are separated. This allows additional 'vector' information that is otherwise masked, to be obtained. This concept is illustrated in FIGS. 17a through 17c.

Figure 17:
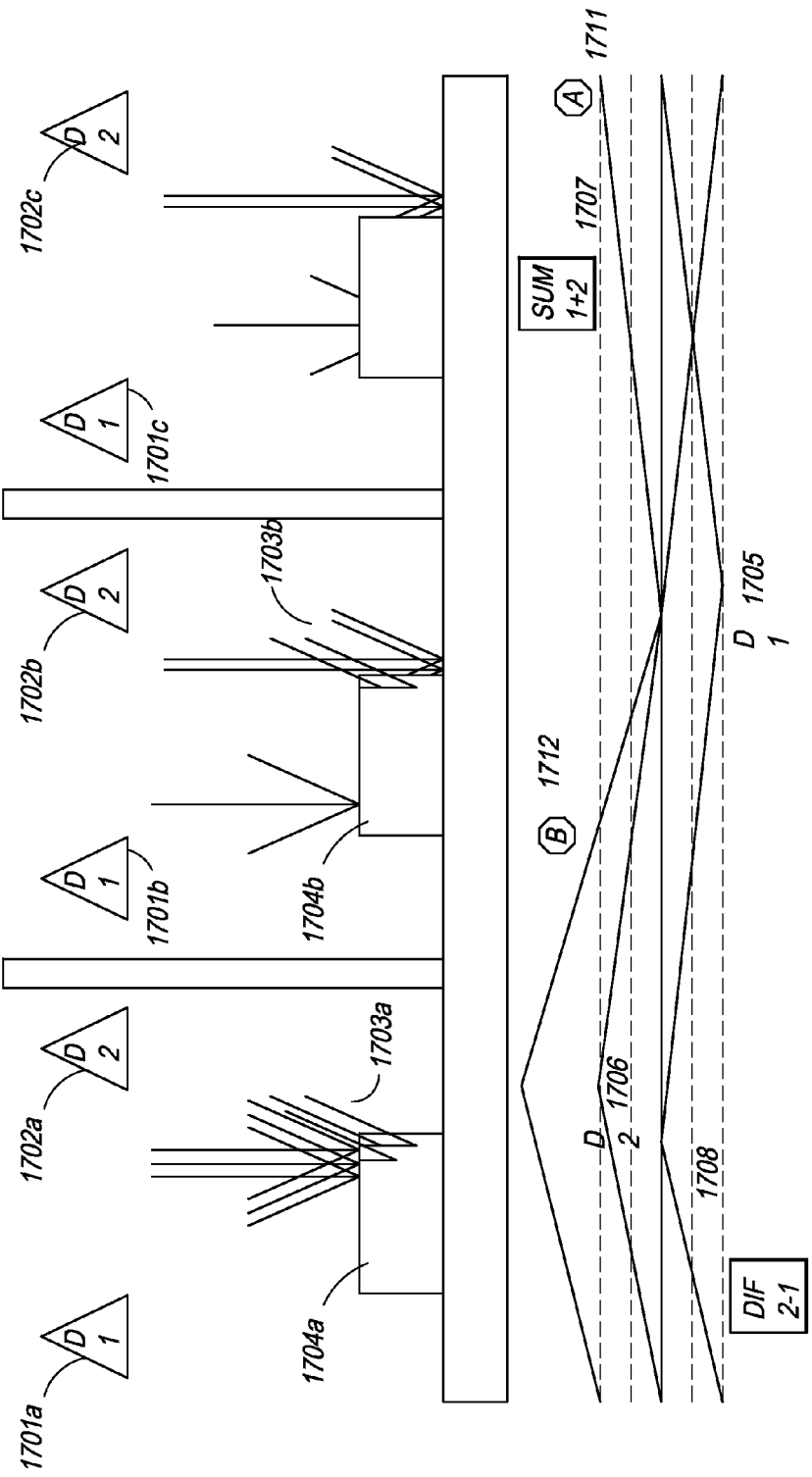
FIG. 17A illustrates the response of two detectors to a radiation beam traversing over an object.
FIG. 17B is another illustration of the response of two detectors to a radiation beam traversing over an object.
FIG. 17C is yet another illustration of the response of two detectors to a radiation beam traversing over an object.

Referring to FIGS. 17a through 17c, a series of pictures illustrates the response of two detectors to a radiation beam traversing over an object.

In general, when the X-ray beam approaches a contour or edge of a material, the scatter will be blocked in the direction of the thicker object and a reduced signal will occur on the detector opposite to the edge. As the spot traverses upon the thicker material, more scatter exits through the recent edge toward the thinner side and the corresponding detector receives more signal. This is the method for determining contours in current imaging systems, with dark regions followed by bright regions in the image. Having separate signals, however, would offer additional information as the spot moves across the edge.

Referring now to FIG. 17a, initially, the signal 1705 received on D1 1701a begins to decrease as the spot 1703a approaches the edge of the object 1704a. At this time, the signal 1706 received at D2 1702a remains normal. Referring to FIG. 17b, as the spot 1703b moves over the edge of the object 1704b, the signal 1705 corresponding to the detector D1 1701b begins to increase back to 'normal' while the signal 1706 for D2 1702b increases above normal until the spot 1703b has moved some distance past the edge of the object 1704b and returns to normal. During the transition as shown in FIG. 17c, the signal 2006 from detector D2 1702c grows while the signal 1705 from D1 1701c is still coming back from a reduced state.

At this time, a loss of information occurs if a combined signal (D1+D2) is used, as is apparent from the curve 1707 representing the combined signal. This is because when the signals for D1 1705 and D2 1706 are equal at points A 1711 and B 1712, the combined signal D1+D2 1707 also follows the same path. However, the difference signal (D1−D2), as represented by curve 1708 touches a near zero value at point A 1711 and a positive (or + vector) value at point B 1712. Similarly, the difference signal for an opposite edge contour would create a negative vector value. This additional information obtained from the difference signal curve 1708 can be used to enhance contours and edges in the images displayed.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive.

We claim:

1. An inspection system for detecting objects being carried by a person, wherein said person is moving along a plane defined by a Z axis and a Y axis, the inspection system comprising:
   a first detection system configured to detect radiation scattered from said person as the erson moves along the Y axis of the plane, wherein said first detection system comprises a first planar surface positioned opposite to the plane, and configured to generate electronic signals responsive to the detected radiation;
   a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display, wherein the X-ray source is coupled with a beam chopper, wherein said beam chopper operates to produce a scanning pencil beam of X-rays along the Z axis, and wherein said beam chopper comprises a chopper wheel having three slits and wherein each slit positioned 120 degrees apart from an adjacent slit.

2. The inspection system of claim 1 wherein said slits are aligned with at least two parallel collimator slits and wherein X-rays emitted from the X-ray source conically illuminate the collimator slits to generate at least two parallel scanning beams interleaved in time.

3. An inspection system for detecting objects being carried by a person, wherein said person is moving along a plane defined by a Z axis and a Y axis, the inspection system comprising:

a first detection system configured to detect radiation scattered from said person as the person moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display, wherein the X-ray source is coupled with a beam chopper, wherein said beam chopper operates to produce a scanning pencil beam of X-rays along the Z axis, and wherein the beam chopper comprises a hollow cylinder having at least one helical aperture.

4. The inspection system of claim 3 wherein the scanning pencil beam has a linear scan velocity and wherein said linear scan velocity is varied or kept constant by modifying a pitch and roll of at least one of said helical apertures.

5. The inspection system of claim 3 wherein the scanning pencil beam has a spot size and wherein said spot size is varied or kept constant by modifying an aperture width of at least one of said helical apertures.

6. An inspection system for detecting objects being carried by a person, wherein said person is moving along a plane defined by a Z axis and a Y axis, the inspection system comprising:

a first detection system configured to detect radiation scattered from said person as the person moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein:

the first detection system is contained within a first enclosure;

said first enclosure has a first width extending from one end of said first enclosure to an opposing end of said first enclosure;

the planar surface extends along the entire first width;

the second detection system is contained within a second enclosure;

the second enclosure has a first width extending from one end of said second enclosure to an opposing end of said second enclosure;

the planar surface extends along the entire first width;

the X-ray source is contained within a third enclosure;

the third enclosure is physically separate from, and independent of, the first and second enclosures;

the first enclosure is physically separate from, and independent of, said second enclosure; and wherein each of the first, second, and third enclosures weigh less than 88 pounds.

7. An inspection system for detecting objects being carried by a person, wherein said person is moving along a plane defined by a Z axis and a Y axis, the inspection system comprising:

a first detection system configured to detect radiation scattered from said person as the erson moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein:

the first detection system is contained within a first enclosure;

said first enclosure has a first width extending from one end of said first enclosure to an opposing end of said first enclosure;

the planar surface extends along the entire first width;

the second detection system is contained within a second enclosure;

the second enclosure has a first width extending from one end of said second enclosure to an opposing end of said second enclosure;

the planar surface extends along the entire first width;

the X-ray source is contained within a third enclosure;

the third enclosure is physically separate from, and independent of, the first and second enclosures;

the first enclosure is physically separate from, and independent of, said second enclosure; and wherein the third enclosure is detachably connected to the first enclosure and the second enclosure.

8. An inspection system for detecting objects being carried by a person, wherein said person is moving along a plane defined by a Z axis and a Y axis, the inspection system comprising:

a first detection system configured to detect radiation scattered from said person as the erson moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein:

the first detection system is contained within a first enclosure;

said first enclosure has a first width extending from one end of said first enclosure to an opposing end of said first enclosure;

the planar surface extends along the entire first width;

the second detection system is contained within a second enclosure;

the second enclosure has a first width extending from one end of said second enclosure to an opposing end of said second enclosure;

the planar surface extends along the entire first width; and wherein the first enclosure comprises:

a first side defined by a planar surface having an exterior surface facing the person and an interior surface, wherein the first side is configured to receive the radiation scattered from the person;

a second side in an acute angular relationship with said first side, wherein said second side is defined by a planar surface having an interior surface adapted to receive radiation passing through the first side and wherein said second side is configured to only receive radiation after it passes through said first side;

a first substrate positioned on the interior surface of the first side, wherein the first substrate further comprises an active area for receiving and converting said radiation into light;

a second substrate positioned on the interior surface of the second side, wherein the second substrate further comprises an active area for receiving and converting said radiation into light; and at least one photodetector having a light responsive area and a non-light responsive area, wherein the light responsive area is positioned to receive the light emitted from the first substrate and the second substrate.

9. The inspection system of claim 8 wherein said radiation comprises X-ray photons and wherein said first substrate detects 30-60% of the X-ray photons impinging on said first side.

10. An inspection system for detecting objects being carried by a person, wherein said person is moving along a plane defined by a Z axis and a Y axis, the inspection system comprising:

a first detection system configured to detect radiation scattered from said person as the person moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein the X-ray source generates a beam spot pattern along the Z axis of the plane by pivoting from a first point to a second point and wherein said pivoting is centered around a predefined point of rotation.

11. An inspection system for detecting objects being carried by a person, wherein said person is moving along a plane defined by a Z axis and a Y axis, the inspection system comprising:

a first detection system configured to detect radiation scattered from said person as the erson moves along the Y axis of the plane, wherein said first detection system comprises a first planar surface positioned opposite to the plane, and configured to generate electronic signals responsive to the detected radiation;

a second detection system configured to detect radiation scattered from said person as the person moves along the Y axis of the plane, wherein said second detection system comprises a second planar surface positioned opposite to the plane, and configured to generate electronic signals responsive to the detected radiation;

an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein the X-ray source and a beam chopper are coupled to a surface configured to tilt vertically in relation to a guide member and in response to a motor.

12. An inspection system for detecting objects being carried by a person, wherein said person is moving along a plane defined by a Z axis and a Y axis, the inspection system comprising:
   a first detection system configured to detect radiation scattered from said person as the person moves along the Y axis of the plane, wherein said first detection system comprises a first planar surface positioned opposite to the plane, and configured to generate electronic signals responsive to the detected radiation;
   a second detection system configured to detect radiation scattered from said person as the person moves along the Y axis of the plane, wherein said second detection system comprises a second planar surface positioned opposite to the plane, and configured to generate electronic signals responsive to the detected radiation;
   an X-ray source positioned between said first detection system and said second detection system, wherein said X-ray source is configured to generate a beam spot pattern along the Z axis of the plane and wherein said X-ray source does not generate beams that move along the Y axis of the plane; and
   a processing system for analyzing the electronic signals generated by the first detection system and the second detection system and for generating an image on a display wherein the X-ray source is coupled to a vertical elevating mechanism wherein said elevating mechanism is coupled to a weight configured to counterbalance the X-ray source.

13. An inspection system for detecting objects being carried by a person, wherein said person is moving along a plane defined by a Z axis and a Y axis, the inspection system comprising:
   a first detection system configured to detect radiation scattered from said person as the person moves along the Y axis of the plane, wherein said first detection system comprises a first planar surface positioned opposite to the plane, and configured to generate electronic signals responsive to the detected radiation;
   a second detection system configured to detect radiation scattered from said person as the person moves along the Y axis of the plane, wherein said second detection system comprises a second planar surface positioned opposite to the plane, and configured to generate electronic signals responsive to the detected radiation;
   an X-ray source positioned between said first detection system and said second detection system, wherein said X-ray source is configured to generate a beam spot pattern along the Z axis of the plane and wherein said X-ray source does not generate beams that move along the Y axis of the plane; and
   a processing system for analyzing the electronic signals generated by the first detection system and the second detection system and for generating an image on a display wherein the X-ray source is coupled to a vertical elevating mechanism wherein said elevating mechanism is coupled to at least one lifting belt.

14. An inspection system for detecting objects being carried by a person, wherein said person is moving along a plane defined by a Z axis and a Y axis, the inspection system comprising:
   a first detection system configured to detect radiation scattered from said person as the person moves along the Y axis of the plane, wherein said first detection system comprises a first planar surface positioned opposite to the plane, and configured to generate electronic signals responsive to the detected radiation;
   a second detection system configured to detect radiation scattered from said person as the person moves along the Y axis of the plane, wherein said second detection system comprises a second planar surface positioned opposite to the plane, and configured to generate electronic signals responsive to the detected radiation;
   an X-ray source positioned between said first detection system and said second detection system, wherein said X-ray source is configured to generate a beam spot pattern along the Z axis of the plane and wherein said X-ray source does not generate beams that move along the Y axis of the plane; and a processing system for analyzing the electronic signals generated by the first detection system and the second detection system and for generating an image on a display wherein the X-ray source is coupled to a vertical elevating mechanism wherein said elevating mechanism is coupled to a gear reducer and motor and is not coupled to a counterbalancing weight.

15. A method for detecting threatening objects concealed on body of person by using an inspection system comprising at least one radiation source to produce a scanning pencil beam of X-rays, wherein said scanning pencil beam has a path, and a detector arrangement comprising at least a first detector enclosure having a first surface and a second detector enclosure having a second surface, the method comprising the steps of:
   a. having the person move past the at least one radiation source in a plane perpendicular to the beam path of the scanning pencil beam and parallel to said first surface and second surface;
   b. generating an X-ray beam within an radiation source enclosure, wherein the radiation source comprises an X-ray source coupled with a beam chopper and wherein the scanning pencil beam is collimated by at least one slit in the radiation source enclosure to generate a vertical beam spot pattern and not a horizontal beam spot pattern;
   c. detecting radiation scattered by the person in at least one of the first detector enclosure or second detector enclosure; and
   d. processing the detected radiation to generate a two dimensional image, wherein said image displays any concealed explosive material being carried by the person.

16. The method of claim 15 wherein the beam chopper comprises a chopper assembly having a hollow cylinder with helical slits extending along a length of the cylinder, a carbon fiber cylinder covering the hollow cylinder, and a polyethylene epoxy cylinder covering the carbon fiber cylinder.

17. The method of claim 16 wherein the chopper assembly is rotated by a magnetic bearing assembly comprising a magnetic rotor and a magnetic bearing stator and wherein the magnetic bearing assembly provides magnetic levitation for the chopper assembly at least during power-up and power-down states of the beam chopper.

* * * * *